US012533650B2

(12) United States Patent
Snell et al.

(10) Patent No.: US 12,533,650 B2
(45) Date of Patent: Jan. 27, 2026

(54) USE OF A CONTINUOUS CATALYST REGENERATION TYPE REFORMER FOR THE AROMAX® CATALYST PROCESS

(71) Applicant: Chevron Phlillps Chemical Company LP, The Woodlands, TX (US)

(72) Inventors: Ryan W. Snell, Jubail Industrial (SA); Scott Morrison, Kingwood, TX (US); Troy Bretz, Tomball, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 730 days.

(21) Appl. No.: 17/820,665

(22) Filed: Aug. 18, 2022

(65) Prior Publication Data

US 2024/0058779 A1 Feb. 22, 2024

(51) Int. Cl.
| | | |
|---|---|---|
| B01J 8/00 | (2006.01) | |
| B01J 8/02 | (2006.01) | |
| B01J 8/04 | (2006.01) | |
| B01J 29/62 | (2006.01) | |
| C01B 3/40 | (2006.01) | |
| B01J 38/42 | (2006.01) | |

(52) U.S. Cl.
CPC .............. *B01J 8/003* (2013.01); *B01J 8/002* (2013.01); *B01J 8/0242* (2013.01); *B01J 8/0278* (2013.01); *B01J 8/0415* (2013.01); *B01J 29/62* (2013.01); *C01B 3/40* (2013.01); *B01J 38/42* (2013.01); *B01J 2208/00752* (2013.01); *B01J 2208/00761* (2013.01); *B01J 2208/06* (2013.01); *C01B 2203/0227* (2013.01); *C01B 2203/107* (2013.01); *C01B 2203/1241* (2013.01)

(58) Field of Classification Search
CPC ........ B01J 8/0415; B01J 8/0278; B01J 8/003; C10G 11/182
See application file for complete search history.

(56) References Cited

U.S. PATENT DOCUMENTS

| | | |
|---|---|---|
| 3,470,090 A | 9/1969 | Carson |
| 3,647,680 A * | 3/1972 | Greenwood ........... C10G 35/12 208/65 |
| 3,761,390 A | 9/1973 | Greenwood |
| 3,782,963 A | 1/1974 | Duvall |
| 3,856,662 A | 12/1974 | Greenwood |
| 3,873,441 A | 3/1975 | Jones |
| 3,882,015 A | 5/1975 | Carson |
| 4,403,909 A | 9/1983 | Greenwood |
| 4,498,973 A | 2/1985 | Sikonia |

(Continued)

FOREIGN PATENT DOCUMENTS

| | | |
|---|---|---|
| FR | 2180269 B1 | 5/1974 |
| FR | 2807678 B1 | 11/2004 |
| WO | 2010074778 A1 | 7/2010 |

OTHER PUBLICATIONS

International Search Report and Written Opinion issued in corresponding PCT Application No. PCT/US2023/072271, mailed on Nov. 17, 2023, 11 pp.

*Primary Examiner* — Lessanework Seifu
(74) *Attorney, Agent, or Firm* — Conley Rose, P.C.; Rodney B. Carroll

(57) ABSTRACT

The present disclosure relates to the aromatization of hydrocarbons with an aromatization catalyst, including methods of aromatization comprising the use of a continuous catalyst regeneration type reformer.

17 Claims, 2 Drawing Sheets

(56) References Cited

U.S. PATENT DOCUMENTS

| | | | |
|---|---|---|---|
| 4,567,023 A | 1/1986 | Greenwood | |
| 4,634,518 A | 1/1987 | Buss | |
| 4,872,969 A | 10/1989 | Sechrist | |
| 4,876,712 A | 10/1989 | Brint | |
| 5,338,440 A | 8/1994 | Sechrist | |
| 5,512,166 A | 4/1996 | Herrenschmidt | |
| 5,516,422 A | 5/1996 | Sajbel | |
| 5,520,798 A | 5/1996 | Innes | |
| 5,683,573 A | 11/1997 | Haizmann | |
| 5,688,473 A | 11/1997 | Lawrence | |
| 5,824,619 A | 10/1998 | Sechrist | |
| 5,840,176 A | 11/1998 | Lawrence | |
| 5,858,209 A | 1/1999 | Schmidt | |
| 5,885,439 A | 3/1999 | Glover | |
| 5,935,415 A | 8/1999 | Haizmann | |
| 5,958,216 A | 9/1999 | Glover | |
| 6,177,002 B1 | 1/2001 | Glover | |
| 6,190,539 B1 | 2/2001 | Holtermann | |
| 7,887,264 B2 | 2/2011 | Naunheimer | |
| 9,085,736 B2 * | 7/2015 | Morrison | B01J 8/0285 |
| 10,478,794 B1 | 11/2019 | Mcgahee | |
| 2001/0049328 A1 | 12/2001 | Zhao | |
| 2013/0256193 A1 | 10/2013 | Lapinski | |
| 2019/0249094 A1 * | 8/2019 | Snell | B01J 29/62 |

\* cited by examiner

USE OF A CONTINUOUS CATALYST REGENERATION TYPE REFORMER FOR THE AROMAX® CATALYST PROCESS

CROSS-REFERENCE TO RELATED APPLICATION

Not applicable.

BACKGROUND

The catalytic conversion of non-aromatic hydrocarbons into aromatic compounds, referred to as aromatization, is an important industrial process used to produce fundamental building block chemicals on which a large portion of the chemical industry is based. The aromatization reactions may include the dehydrogenation, isomerization, and hydrocracking of hydrocarbons, each of which produces certain aromatic compounds. These reactions are generally conducted in one or more aromatization reactors containing aromatization catalysts. These catalysts may increase the selectivity to desired aromatic compounds, and/or the conversion rates of the reaction to the desired aromatic compounds. While under commercial aromatization conditions, these catalysts slowly lose activity as evidenced by a loss of selectivity to desired products; a loss of endotherm and/or a reduction in conversion rates. For example, the catalysts may be poisoned by the presence of contaminants thus degrading their activities. Continued use of the catalyst may result in a catalyst that no longer efficiently catalyzes a user-desired process and/or produces significant byproducts, termed a spent catalyst. Given their commercial importance and the expenses incurred in producing fresh or regenerated catalyst and replacing spent catalyst with same, an ongoing need exists for improved systems and methods wherein aromatization catalysts are efficiently utilized.

SUMMARY

Certain aspects of the disclosure relate to a method of operating a reforming reactor system, the method comprising: operating the reactors of a stacked reactor system comprising at least one reactor stack, wherein each reactor stack comprises at least two stacked radial flow reactors; each radial flow reactor containing a reforming catalyst capable of catalyzing the conversion of hydrocarbons in a hydrocarbon feed to provide a reactor effluent comprising aromatic hydrocarbons, and wherein the reforming catalyst comprises a Group VIII metal, a zeolitic support, and at least one halogen. In related embodiments, the method comprises operating the reactors of the stacked reactor system via operation of the radial flow reactors as stationary fixed beds, such that the reforming catalyst is stationary, i.e., not moved, during the operation of a run. In additional aspects, the hydrocarbons in the hydrocarbon feed comprise convertible hydrocarbons selected from hydrocarbons having six or seven carbon atoms, i.e., $C_6$ or $C_7$ hydrocarbons, without an internal quaternary carbon, as well as $C_6$ hydrocarbons lacking two adjacent internal tertiary carbons. Further embodiments relate to the operation of the reforming reactor system for converting the convertible hydrocarbons in the hydrocarbon feed until the reforming catalyst is determined to be a spent reforming catalyst.

Additionally, the method may comprise, after the catalyst is determined to be spent, discontinuing the introduction of the hydrocarbon feed, purging the reactors until the reactor effluent comprises less than about 200 ppm of hydrocarbons, having the reactors reach ambient temperature, removing the spent reforming catalyst within the radial flow reactors of each reactor stack via the bottommost radial flow reactor of each reactor stack or via the bottommost reactor of a final reactor stack with conveying between stacks, with the catalyst flowing downward through the at least one stack of radial flow reactors for removal, and adding fresh reforming catalyst to the top of the topmost radial flow reactor of each reactor stack or to the top of the topmost radial flow reactor of the first reactor stack with conveying between stacks, wherein fresh reforming catalyst flows downward through the at least one stack of radial flow reactors. The method may, in aspects, further relate to the use of a reforming reactor system comprising at least one purge chamber fluidly attached to a bottommost radial flow reactor of each reactor stack, or a bottommost reactor of a final reactor stack with conveying between stacks, where the spent reforming catalyst is removed from the bottommost radial flow reactor through the purge chamber prior to removing the catalyst from the stacked reactor system.

In certain embodiments, the purge chamber of the reactor system is optionally purged with a gas comprising hydrogen, nitrogen, argon, helium, or combinations thereof. In related aspects, the reforming reactor system comprises a first purge chamber upstream of, and fluidly connected with, a second purge chamber. In still further embodiments, a reactor system purging may encompass purging the first purge chamber with a first purge gas, and purging the second purge chamber with a second purge gas, where the first purge gas and the second purge gas may be the same or different. For instance, in non-limiting aspects the first purge gas comprises hydrogen and the second purge gas comprises nitrogen, or the first purge gas comprises nitrogen and the second purge gas comprises hydrogen. In some embodiments, the stacked reactor system described herein further comprises a purge chamber fluidly connected to the topmost radial flow reactor of each reactor stack, or a topmost reactor of a first reactor stack with conveyance between the stacks, where fresh reforming catalyst may be beneficially added to the topmost radial flow reactor through the purge chamber and, in related aspects, purged with a purge gas comprising one or more of hydrogen, nitrogen, argon, and/or helium, including nitrogen as a stand-alone purge gas.

A zeolitic support or supports for use in accordance with the disclosed methodology may comprise, in non-limiting aspects, the use of a silica-bound L-zeolite support. In additional embodiments, the stacked reactor system disclosed herein is advantageously operable to provide movement of the reforming catalyst through the at least one reactor stack over a significant period of time, including a time period of at least about 180 days, at least about 270 days, at least about 365 days, or longer than 365 days. The stacked reactor system is further operable to, in aspects, provide movement of the reforming catalyst through the at least one reactor stack, and to a regeneration system via a catalyst transfer system. Accordingly, related embodiments associated with the catalyst transfer system involve transfer of the reforming catalyst through at least one purge chamber attached to the bottommost radial flow reactor of each of the at least one reactor stacks, or to the bottommost radial flow reactor of a final of the at least one reactor stacks, with conveyance between the stacks, to the regeneration system.

The catalyst transfer system is, in particular aspects, arranged or positioned for fluidly connecting the at least one purge chamber with a top of the regeneration system, as further described herein, such that the movement of the reforming catalyst through the catalyst transfer system to the regeneration system may be best controlled by an operator and/or an operation or control system, including embodiments where movement of the reforming catalyst is intermittent. Further aspects of the disclosed technology relate to the reforming catalyst in one stack of the at least one stack of radial flow reactors being transferred via the catalyst transfer system to the regeneration system at a periodic interval and/or based on a transfer schedule, for instance, transferring the reforming catalyst after about 180 days, about 270 days, about 365 days, or longer.

In some embodiments, the method relates to regenerating the reforming catalyst via a regeneration process during passage through the regeneration system, and introducing the regenerated reforming catalyst to the topmost radial flow reactor of each of the at least one reactor stacks or to the topmost radial flow reactor of a first reactor stack with conveying between stacks, with the regenerated reforming catalyst subsequently introduced to the topmost radial flow reactor via at least one purge chamber and at least one regenerated catalyst conveyance system. In related aspects, the regenerated catalyst may be reduced via one or more of decoking, halogenation, oxychlorination, chlorination, fluorination (including but not limited to low-temperature fluorination), reduction, or a combination thereof prior to its conveyance to the top of the at least one reactor stack or after conveyance to the top of the at least one reactor stack. The reforming catalyst may be characterized by any number of physicochemical measurements or characteristics known to the skilled artisan, including but not limited to crush strength. Accordingly, in certain aspects the reforming catalyst comprises a crush strength of less than about 15 pound-force ($lb_f$), about 13 $lb_f$, or about 10 $lb_f$.

In embodiments, the regeneration system of the disclosed method is operable to provide movement of the reforming catalyst through a series of radial flow regeneration reactors, including aspects where the reforming catalyst passes through the regeneration system, and back to the stacked reactor system via a regenerated catalyst transfer system over a time period of about a week. Further aspects are directed to the extraction of spent reforming catalyst via at least one purge vessel attached to the bottom of the at least one reactor stack, where the spent reforming catalyst is replaced with "replacement" reforming catalyst (which, in related embodiments, comprises fresh catalyst, regenerated reforming catalyst, or combinations thereof) that may be added back into the at least one reactor stack through at least one purge vessel and at least one reduction vessel, with the purge vessel operable to purge out air, and replace it with a reactive or inert gaseous atmosphere, such as a nitrogen or a hydrogen atmosphere.

In further embodiments, the at least one reduction vessel is operable to subject the catalyst to a reducing gas such as hydrogen. In still further aspects, the regenerated catalyst is provided by transporting the spent reforming catalyst to a regenerator co-located at the same facility, or located at a separate regeneration facility, and regenerating the catalyst. The catalyst may be regenerated continuously or batchwise, with batchwise regeneration generally associated with at least some aspects of the disclosed methodology, including embodiments associated with extraction of the spent reforming catalyst from the at least one reactor stack, and subsequent regeneration of the spent reforming catalyst. As noted in additional catalyst movement processes and steps associated with the present technology, embodiments of the disclosed method are associated with the movement of the reforming catalyst through the at least one reactor stack to the purge vessel attached to the bottom of the at least one reactor stack over a time period of at least about 180 days, about 270 days, about 365 days, or greater than 365 days.

Embodiments of the disclosed methodology are characterized by the reduction and/or elimination of components, features, processes, steps, etc., that may disadvantageously reduce the efficacy or life span of the catalyst. Accordingly, in some aspects the internal components, surfaces, etc., of the regenerator are not coated with compositions potentially capable of poisoning the catalyst, including but not limited to tin-comprising metal protective layers, also referred to herein as MPT or tin MPT. Additionally, the stacked reactor system may further comprise a regenerator capable of being utilized for, inter alia, the storage of spent catalyst where, upon an amount of spent catalyst stored in the regenerator reaching a predetermined threshold amount, the spent catalyst stored therein may be regenerated. In still further embodiments, the spent catalyst is removed from the regenerator when an amount of spent catalyst stored in the regenerator reaches a predetermined threshold amount and replaced with additional (replacement) catalyst comprising fresh reforming catalyst. In related aspects, the methodology further comprises loading the fresh reforming catalyst into the purge chamber and the reduction vessel prior to a topmost reactor of the at least one reactor stack, and reducing it prior to introducing the fresh reforming catalyst as the replacement catalyst into the topmost reactor of the at least one reactor stack.

The stacked reactor system may be configured in myriad arrangements for best performing the disclosed methodology, including aspects where the stacked reactor system is configured for one or more of 1) the initial introduction of the reforming catalyst into a purge tank connected to a reduction vessel connected to a topmost radial flow reactor of one of the at least one reactor stacks; and/or 2) the introduction of fresh hydrocarbon feed into the topmost radial flow reactor, such that reduced reforming catalyst and hydrocarbon feed are flowing co-currently or concurrently through the at least one reactor stack. In additional aspects, an operating temperature of the topmost radial flow reactor is lower than an operating temperature of a radial flow reactor downstream of the topmost radial flow reactor, while movement of the reforming catalyst through the at least one reactor stack occurs over a time period of at least about 180 days, about 270 days, about 365 days, or greater than 365 days.

Aspects associated with the stacked reactor system may further comprise configurations for the introduction of fresh hydrocarbon feed into a bottom reactor of one of the at least one reactor stacks, such that the reforming catalyst and the hydrocarbon feed are flowed counter-currently through the at least one reactor stack, with movement of the reforming catalyst through the at least one reactor stack occurring over a time period of at least about 180 days, about 270 days, about 365 days, or greater than 365 days. In further embodiments, an operating temperature of a bottom reactor of each of the at least one reactor stacks is less than an operating temperature of a top reactor thereof, with the bottom reactor of each of the at least one reactor stacks further capable of serving as a guard bed to beneficially protect downstream reactors in the one or more reactor stacks (containing more active catalyst) from at least one undesirable compound, including but not limited to compounds capable of poisoning and/or reducing the efficacy of the catalyst, such as sulfur, heavies, nitrogen, or combinations thereof. Accordingly, aspects of the reforming reactor system associated with the disclosed methodology are advantageously associated with the lack of necessity regarding the incorporation or utilization of a sulfur converter adsorber (SCA) upstream of the stacked reactor system, i.e., no SCA is present in the system.

In some aspects, the present disclosure is related to a reforming reactor system comprising a continuous catalyst regeneration (CCR) system comprising at least one reactor stack, where each reactor stack comprises at least two radial flow reactors, with each radial flow reactor containing a reforming catalyst capable of catalyzing the conversion of hydrocarbons in a hydrocarbon feed to provide a reactor effluent comprising aromatic hydrocarbons, and where the reforming catalyst comprises a Group VIII metal, a zeolitic support, and at least one halogen. In some aspects, the system may further comprise a regeneration reactor system connected to the at least one reactor stack via a spent catalyst transfer system and configured for regenerating the reforming catalyst. The reforming reactor system may be further configured, in embodiments, for facilitating movement of the reforming catalyst through the at least one reactor stack over an extended time period, including but not limited to at least about 180 days, about 270 days, about 365 days, or greater than 365 days. Certain aspects of the system may include one or more of 1) the optional coating of one or more components of the reforming reactor system with tin MPT; and 2) the incorporation of a silica-bound L-zeolite support in the reforming catalyst, with the catalyst (which may be present as an extrudate) characterized in some embodiments by a crush strength of less than about 15 $lb_f$, about 13 $lb_f$, or about 10 $lb_f$. In related aspects, the at least one halogen of the reforming catalyst comprises fluorine, and wherein the regeneration reactor system is operable to refluorinate any spent reforming catalyst received, for instance, from the spent catalyst transfer system. In beneficial embodiments, the interior surface of the regeneration reactors and reactor internals of the regeneration reactor system are operable in the absence of protective coating, e.g., the interior surface of the regeneration reactors and reactor internals of the regeneration reactor system do not have to be coated with a metal protective layer, e.g., tin MPT.

In some aspects, the CCR system is configured for introducing the reforming catalyst into at least one topmost reactor through the use of a purge vessel and a reduction reactor, where the at least one topmost reactor is a topmost reactor of one of the at least one reactor stacks. In related embodiments, the CCR system is configured for introducing fresh hydrocarbon feed into the top reactor, such that the reforming catalyst and the hydrocarbon feed flow concurrently or co-currently through the at least one reactor stack, and further configured for facilitating movement of the reforming catalyst through the at least one reactor stack over a time period of at least about 180 days, about 270 days, about 365 days or longer than 365 days. The CCR system may be, in further aspects, configured for introducing fresh hydrocarbon feed into a bottommost radial flow reactor of one of the at least one reactor stacks, such that the reforming catalyst and the hydrocarbon feed flow counter-currently through the at least one reactor stacks, including over time periods of at least about 180 days, about 270 days, about 365 days, or longer than 365 days. In additional embodiments, the bottom reactor of each of the at least one reactor stacks is capable of performing or serving as a guard bed to protect downstream reactors in the at least one reactor stack, which contain more active catalyst, from at least one undesirable compound, which includes but is not limited to sulfur, heavies, nitrogen, or combinations thereof. As such, the disclosed reforming reactor system may advantageously be characterized by the lack of a sulfur converter adsorber (SCA) positioned upstream of the CCR system.

In some aspects, the disclosed system may comprise at least two reactor stacks, configured for introduction of reforming catalyst into a top reactor of each of the at least two reactor stacks, wherein spent catalyst is removed from a bottom reactor of each of the at least two reactor stacks, and wherein fresh hydrocarbon feed is introduced into a bottom reactor of one of the at least two reactor stacks and passes therethrough, and through a bottom reactor of a second of the at least two reactor stacks before passing sequentially to a next reactor up of the first of the at least two reactor stacks to a next reactor of the second of the at least two reactor stacks, and so on through the plurality of reactors of each of the at least two reactor stacks, until passing through the top reactor of the second of the at least two reactor stacks, from which the reactor effluent is extracted. In advantageous embodiments, the bottom reactor of each of the at least two reactor stacks is capable of serving as, inter alia, a guard bed to protect downstream reactors in each of the at least two reactor stacks, which contain more active catalyst, from at least one undesirable compound selected from sulfur, heavies, nitrogen, and combinations thereof, thereby eliminating the need for a SCA unit positioned upstream of the CCR system.

Aspects of the present disclosure further relate to a method of operating a continuous catalyst regeneration (CCR) system comprising at least one stack of radial flow reactors, the process comprising operating the CCR system to convert hydrocarbons in a hydrocarbon feed into aromatic hydrocarbons, where catalyst is continuously circulated in a flow-loop within the CCR system and an entirety of the catalyst is regenerated at least once a week, shutting down the CCR system to cease conversion of the convertible hydrocarbons into the aromatic hydrocarbons, replacing the existing catalyst within the CCR system with a replacement catalyst comprising platinum (Pt), fluoride (F), and/or chloride (Cl) on a silica-bound L-zeolite support, and starting up the CCR to continue conversion of the hydrocarbons in the hydrocarbon feed into the aromatic hydrocarbons, where the replacement catalyst is not continuously circulated in a flow-loop within the CCR system. In further embodiments, the replacement catalyst is static within the CCR system during the conversion of the hydrocarbons in the hydrocarbon feed into the aromatic hydrocarbons products described herein, including hydrocarbons selected from hydrocarbons having six or seven carbon atoms without an internal quaternary carbon, and hydrocarbons having six carbon atoms without two adjacent internal tertiary carbons. Additional aspects related to the operation of the reforming reactor system comprises converting the convertible hydrocarbons in the hydrocarbon feed until the reforming catalyst is determined to be a spent reforming catalyst, at or after which time the catalyst may be regenerated as described herein.

In some embodiments, the disclosed method of operating a continuous catalyst regeneration (CCR) system may, after the catalyst is determined to be spent, further comprise discontinuing the introduction of the hydrocarbon feed, purging the reactors until the reactor effluent comprises less than about 200 ppm of hydrocarbons, having the reactors reach ambient temperature, removing the spent reforming catalyst within the radial flow reactors of each reactor stack via the bottommost radial flow reactor of each reactor stack or via the bottommost reactor of a final reactor stack with conveying between stacks, with the catalyst flowing downward through the at least one stack of radial flow reactors for removal, and adding fresh reforming catalyst to the top of the topmost radial flow reactor of each reactor stack or to the top of the topmost radial flow reactor of the first reactor stack with conveying between stacks, where fresh reforming catalyst flows downward through the at least one stack of radial flow reactors.

In related aspects, the reforming reactor system further comprises at least one purge chamber or lock hopper fluidly attached to a bottommost radial flow reactor of each reactor stack or a bottommost reactor of a final reactor stack with conveying between stacks, where the spent reforming catalyst is removed from the bottommost radial flow reactor through the purge chamber prior to removing the catalyst from the stacked reactor system. In embodiments, the method further comprising purging the purge chamber with a gas comprising hydrogen, nitrogen, or both. In additional embodiments, the reforming reactor system of the disclosed method comprises a first purge chamber upstream of, and fluidly connected with, a second purge chamber, such that purging of the first purge chamber with a first purge gas, and purging the second purge chamber with a second purge gas is operable or may be performed. In related aspects, the first purge gas comprises hydrogen and the second purge gas comprises nitrogen or, alternatively, the first purge gas comprises hydrogen and the second purge gas comprises nitrogen. Regarding the reactor system of the method, the stacked reactor system may further comprise a purge chamber fluidly connected to the topmost radial flow reactor of each reactor stack, or a topmost reactor of a first reactor stack capable of conveyance or transfer between stacks where, for instance, fresh reforming catalyst may be added to the topmost radial flow reactor through the purge chamber and optionally purged with a purge gas such as nitrogen.

Some aspects of the present disclosure relate to a method of operating continuous catalyst regeneration (CCR) system comprising operating the CCR system to convert hydrocarbons in a hydrocarbon feed into aromatic hydrocarbons, wherein catalyst is continuously circulated in a flow-loop within the CCR system and an entirety of the catalyst is thereby regenerated at least once a week, shutting down the CCR system to cease conversion of the convertible hydrocarbons into the aromatic hydrocarbons, replacing the existing catalyst within the CCR system with a replacement catalyst comprising Pt, F, and Cl on a silica-bound L-zeolite support, and starting up the CCR to continue conversion of the convertible hydrocarbons into the aromatic hydrocarbons, where the replacement catalyst may be intermittently circulated in a flow-loop within the CCR system and an entirety of the catalyst is thereby regenerated no more than once a year.

BRIEF DESCRIPTION OF THE DRAWINGS

The following figures illustrate embodiments of the subject matter disclosed herein. The claimed subject matter may be understood by reference to the following description taken in conjunction with the accompanying figures, in which like reference numerals identify like elements, unless otherwise indicated, and in which:

DETAILED DESCRIPTION

Figure 1:
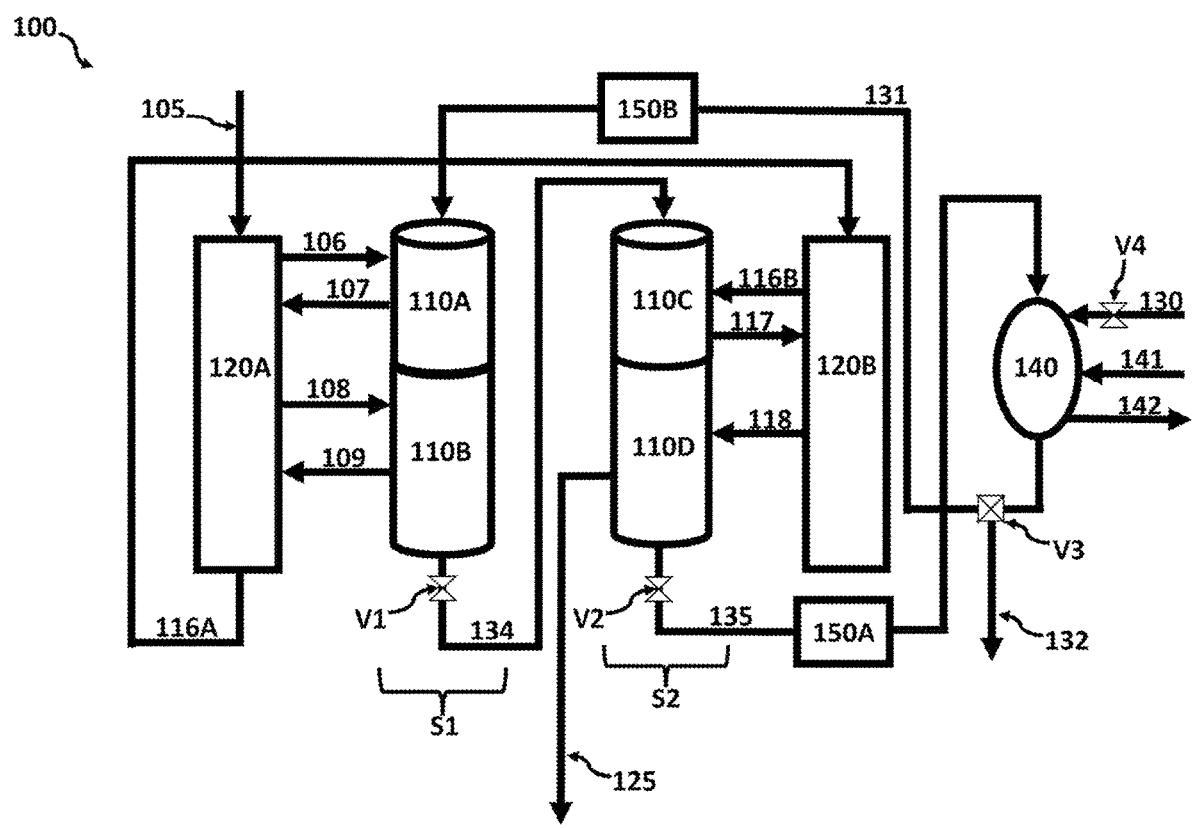
FIG. 1 is a flow diagram of a stacked reactor system for use in an aromatization process according to an embodiment of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides for methods and systems related to the operation of a reforming reactor system comprising at least one reactor stack. In embodiments, the reforming reactor system is an existing CCR (continuous catalyst regeneration) system previously operated to produce higher octane hydrocarbons via reforming with a reforming catalyst, that is repurposed as described herein for the conversion of light naphtha into benzene, toluene, and xylenes (BTX) via an aromatization catalyst that may comprise a zeolitic support. Although repurposing of a continuous catalyst regeneration reforming system is described in detail herein, it is envisaged that systems based on other reforming technologies, including semi regeneration and cyclic regeneration, could also be repurposed according to this disclosure, and such are intended to be within the scope of this disclosure.

The demand for higher octane value hydrocarbons has decreased significantly in the United States for a variety of reasons, including ethanol blending as well as lower overall gasoline demand. Therefore, in some cases, reformer utilization has dropped to a point where it is no longer economical to operate. Rather than shut down such reforming units, they may be repurposed for the production of chemicals according to embodiments of this disclosure. One of the most common types of reformers utilizes the Continuous Catalyst Regeneration (or 'CCR') process. CCR units conventionally operate via constant catalyst flow through stacked radial flow reactors to a regenerator, although non-stacked radial flow reactors as previously reported may be incorporated into the disclosed systems and methods in accordance with alternative aspects. In the regenerator, coke is burned off, and activity restored to the catalyst. Such catalyst regeneration typically occurs at least weekly. Such conventional CCR processes generally employ four reactors, with heating applied between each one to provide heat for the endothermic reforming reaction(s). As CCR operates via moving beds, the CCR catalyst is typically mechanically strong, often consisting of platinum/alumina ($Pt/Al_2O_3$).

Aromatization (also referred to herein as 'reforming') processes, such as the AROMAX® process, can be utilized to convert light naphtha to benzene and toluene via fixed bed radial flow reactors. As in the CCR process, the hydrocarbons to be subjected to aromatization are heated on passage from one reactor to the next in order to provide for the endothermic heat of reaction. Aromatization catalyst (also referred to herein as reforming catalyst), such as the AROMAX® catalyst, may comprise Pt, Cl, and F supported on silica bound L-zeolite. A typical run length for an aromatization catalyst such as the AROMAX® catalyst may be on the order of 1.5 to 2.5 years, after which the catalyst is removed and disposed of or regenerated. This turnaround is quite costly due to both downtime and other expenses.

Conventional fixed bed radial flow aromatization reactor design often results in underutilization of catalyst that is located closer to the center pipe, as the feed cools down in response to the endothermic reaction as it moves from the outside to the inside of the aromatization reactor. Therefore, catalyst located on the inside of the fixed bed radial flow reactor generally still has some additional life left when it is dumped at the end of run.

It has been unexpectedly discovered that stacked reactors, such as reactors of a CCR system, designed for moving bed operation, can be put to use in the aromatization of hydrocarbons via aromatization catalyst, such as the AROMAX® catalyst. Although described herein with reference to AROMAX® catalyst, the system and method of this disclosure may be suitable for use with other aromatization catalysts generally considered too weak (e.g., too low a crush strength, as described further herein) for utilization in a moving bed reactor system, and utilization of the herein-disclosed system and method with such catalysts is intended to be included in the scope of this disclosure.

A distinction between the CCR process and the AROMAX® process is the catalyst regeneration step. In a CCR process, the catalyst flows down through a stacked reactor system and over to a regenerator where it is typically contacted with oxygen for coke burn, chlorine for platinum redispersion, and hydrogen for reduction, before being sent back to the stacked reactors. The catalyst is capable of being moved fairly quickly to the regenerator, with the catalyst capable of passing therethrough approximately every week. In contrast, the AROMAX® catalyst is not significantly regenerated with a coke burn and platinum redispersion alone, and is not regenerated once a week or even once a month. Three variations for utilizing a CCR or stacked reactor set up (either pre-existing or grass-roots design) with the AROMAX® catalyst are provided herein. A first variation comprises operating the radial flow reactors of a stacked reactor system as stationary fixed beds; a second variation comprises operating the radial flow reactors of a stacked reactor system with movement of catalyst therethrough to a downstream regeneration system and reintroduction of regenerated catalyst to the stacked reactors; a third variation comprises operating the radial flow reactors of a stacked reactor system with movement of catalyst therethrough without downstream regeneration and reintroduction of catalyst to the stacked reactors.

As shown in FIG. 1, aspects related to a method of operating a reforming reactor system comprising at least one reactor stack, where each reactor stack comprises at least two stacked radial flow reactors, and each radial flow reactor containing a reforming catalyst capable of catalyzing the conversion of hydrocarbons in a hydrocarbon feed to provide a reactor effluent comprising aromatic hydrocarbons, are provided. In embodiments, the reforming catalyst comprises a Group VIII metal, a zeolitic support, and at least one halogen. In embodiments, the reforming reactor system comprises a continuous catalyst regeneration (CCR) system, retrofitted and/or operated with an aromatization catalyst as described herein.

A description of embodiments associated with a reforming system and process according to this disclosure will now be made with reference to FIG. 1, which is a flow diagram of a stacked reactor system 100 for use in an aromatization process according to an embodiment of this disclosure. A reforming reactor system of this disclosure comprises at least one stack of reforming reactors. Stacked reactor system 100 comprises two stacks of reforming reactors, a first stack S1 of reforming reactors, and a second stack S2 of reforming reactors. A reforming reactor system according to this disclosure can further comprise heat transfer apparatus configured to heat the effluent of one reforming reactor prior to introduction into a reactor downstream therefrom. System 100 comprises heat exchanger 120A, and heat exchanger 120B. In embodiments, first heat exchanger 120A and second heat exchanger 120B are a single heat exchanger.

A reforming reactor system of this disclosure may further comprise an inter-stack transport line operable to convey reforming catalyst between reactor stacks of a multi-stack system. Stacked reactor system 100 comprises inter-stack transport line 134. A valve V1 may be operable to control the flow of catalyst out of first reactor stack S1. A reforming reactor system of this disclosure may further comprise one or more vessels operable as lock hoppers, purge vessels, and/or reduction vessels attached to and/or fluidly connected with a bottommost reforming reactor of each reactor stack, or attached to and/or fluidly connected with the bottommost reactor in a last stack in a system comprising a series (i.e., a plurality) of reactor stacks with conveying between stacks. Stacked reactor system 100 comprises vessel 150A fluidly connected with the bottommost reactor (i.e., fourth reforming reactor 110D) of the last reactor stack (i.e., second reactor stack S2).

A reforming reactor system of this disclosure may further comprise one or more vessels operable as purge vessels, and/or reduction vessels attached to and/or fluidly connected with a topmost reforming reactor each reactor stack, or attached to and/or fluidly connected with the topmost reactor in a first stack in a system comprising a series (i.e., a plurality) of stacks with conveying between stacks. Stacked reactor system 100 comprises vessel 150B fluidly connected with the topmost reactor (i.e., first reforming reactor 110A) of the first reactor stack (i.e., first reactor stack S1).

A reforming reactor system of this disclosure may further comprise a used catalyst transport line (also referred to herein as a 'spent' catalyst transport line) configured to transfer used catalyst exiting the reforming reactor stack(s) to a downstream unit, such as a catalyst regenerator, a storage vessel, and the like. Stacked reactor system 100 comprises used catalyst transport line 135. A reforming reactor system of this disclosure may further comprise a downstream unit, such as a catalyst regenerator, a storage vessel, and the like. Stacked reactor system 100 comprises downstream unit 140. Used catalyst transfer line 135 may fluidly connect a final stack of the stacked reactor system with downstream unit 140, optionally via vessel(s) 150A. One or more valves V2 may be operable to control the flow of catalyst out of second reactor stack S2. Although valve V2 is indicated upstream of vessel 150A, a valve V2 may be positioned upstream or downstream of vessel 150A, in embodiments. Stacked reactor system 100 may comprise a make-up catalyst inlet line 130 and a valve V4 operable to control the amount of make-up catalyst introduced thereby to downstream unit 140.

A reforming reactor system of this disclosure may further comprise a replacement catalyst transport line or conveyance system configured to transport catalyst (which may be regenerated catalyst, fresh catalyst, make-up catalyst, or a combination thereof, in various embodiments) from a downstream unit to a topmost reforming reactor of each reactor stack, or to the topmost reactor in a first reactor stack in a system comprising a series (i.e., a plurality) of reactor stacks with conveying between stacks, optionally via one or more reducing vessels, purge vessels, and/or lock hoppers. For example, in embodiments, an existing CCR is being repurposed for use with the aromatization (e.g., AROMAX® catalyst). Such a CCR system may comprise catalyst transfer lines whereby catalyst can be continuously circulated about the system during a run. Stacked reactor system 100 comprises replacement catalyst transport line or conveyance system 131 configured to transport catalyst from downstream unit 140 to first or topmost reforming reactor 110A in first reactor stack S1. Replacement catalyst conveyance system 131 may be operable to introduce catalyst into topmost reactor 110A via a vessel 150B fluidly connected to the topmost radial flow reactor of each reactor stack or a topmost reactor of a first reactor stack with conveying between stacks. Vessel 150B may comprise a purge chamber. A purge line or 'catalyst dump' line 132 may be fluidly connected with replacement catalyst conveyance system 131 via a valve V3, operable to control the flow of catalyst out of system 100 via catalyst purge line 132.

A reforming reactor system of this disclosure may further comprise a number of valves configured to direct the flow of catalyst throughout the system, as discussed further herein. Stacked reactor system 100 of FIG. 1 comprises valves V1, V2, V3, and V4. Valves, as seen in FIG. 1, and described herein, are used as tools to describe flow paths and are intended to limit this disclosure to a particular operating procedure or equipment set up. The aforementioned components of a reforming reactor system according to this disclosure will be described in more detail herein.

A hydrocarbon feed comprising hydrocarbons to be converted into aromatic hydrocarbons is introduced via hydrocarbon feed line 105 into first heat exchanger 120A, wherein the temperature of the hydrocarbon feed is increased to a desired first reforming reactor inlet temperature. Heated hydrocarbon feed is introduced from first heat exchanger 120A into first or 'topmost' reforming reactor 110A of first reactor stack S1 via first reactor inlet line 106.

The hydrocarbon feed comprises both convertible and nonconvertible hydrocarbons comprising, in some aspects, at least about 96 wt. % of $C_6$ through $C_8$ hydrocarbons, and up to about 4% of $C_9$ or greater hydrocarbons. As utilized herein, 'convertible' hydrocarbons include hydrocarbons having six or seven carbon atoms without an internal quaternary carbon, and hydrocarbons having six carbon atoms without two adjacent internal tertiary carbons. Such convertible hydrocarbons may comprise methylpentanes, methylhexanes, dimethylpentanes, and mixtures thereof. The convertible components may include 2-methylpentane, 3-methylpentane, 2,4-dimethylpentane, 2,3-dimethylpentane, n-hexane, 2-methylhexane, 3-methylhexane, n-heptane, and mixtures thereof. As utilized herein, 'nonconvertible' hydrocarbons include highly branched hydrocarbons comprising six or seven carbon atoms with an internal quaternary carbon, and hydrocarbons having six carbon atoms and two adjacent tertiary carbons. The highly branched hydrocarbons include dimethylbutanes (DMBs), trimethylbutanes, dimethylpentanes, and mixtures thereof. The highly branched hydrocarbons with six or seven carbon atoms with an internal quaternary carbon may comprise, for example, 2,2-dimethylbutane, 2,2-dimethylpentane, 3,3-dimethylpentane, 2,2,3-trimethylbutane, and combinations thereof. The highly branched hydrocarbons with six carbon atoms and an adjacent internal tertiary carbon atom may comprise 2,3-dimethylbutane. The highly branched hydrocarbons do not easily convert to aromatic products and instead tend to convert to light hydrocarbons. As used herein, 'unreacted' hydrocarbon refers to convertible hydrocarbon that has passed through a reforming reactor stack without being converted into aromatic hydrocarbons.

Within first/topmost reforming reactor 110A, convertible hydrocarbons in the hydrocarbon feed are converted (or partially converted) to reformer product comprising BTX, via contact with an aromatization catalyst and under operating conditions as described herein. Effluent comprising aromatic hydrocarbons is removed from first reforming reactor 110A via first reactor effluent line 107. The first reactor effluent is introduced into first heat exchanger 120A via first reactor effluent line 107, wherein it is heated to the desired downstream reforming reactor inlet temperature. Heated first reactor effluent is introduced from first heat exchanger 120A into second reforming reactor 110B via second reforming reactor inlet line 108. Within second reforming reactor 110B, convertible hydrocarbons are converted to reformer product comprising BTX, via contact with an aromatization catalyst and under operating conditions as described herein. Effluent comprising aromatic hydrocarbons is removed from second reforming reactor 110B via second reforming reactor effluent line 109. The second reactor effluent is introduced into first heat exchanger 120A via first reforming reactor effluent line 109, wherein it is heated to the desired downstream reforming reactor inlet temperature. Heated second reactor effluent is introduced from first heat exchanger 120A and optionally second heat exchanger 120B (to which it may be introduced via interstack hydrocarbon transport line 116A, which transports hydrocarbon between first reactor stack S1 and second reactor stack S2) into third or 'topmost' reforming reactor 110C of second reactor stack S2 via third reforming reactor inlet line 116B.

Within third reforming reactor 110C, convertible hydrocarbons are converted to reformer product comprising BTX, via contact with an aromatization catalyst and under operating conditions as described herein. Effluent comprising aromatic hydrocarbons is removed from third reforming reactor 110C via third reforming reactor effluent line 117. The third reactor effluent is introduced into second heat exchanger 120B via third reforming reactor effluent line 117, wherein it is heated to the desired downstream reforming reactor inlet temperature. Heated third reactor effluent is introduced from second heat exchanger 120B into fourth reforming reactor 110D via fourth reforming reactor inlet line 118. Within fourth reforming reactor 110D, convertible hydrocarbons are converted to reformer product comprising BTX, via contact with an aromatization catalyst and under operating conditions as described herein. Effluent comprising aromatic hydrocarbons is removed from fourth or bottommost reforming reactor 110D of second reactor stack S2 via fourth reforming reactor effluent or 'hydrocarbon product' outlet line 125.

Reforming reactor system 100 comprises first reactor stack S1 comprising first and second reforming reactors 110A and 110B, respectively. First reforming reactor 110A is the topmost reforming reactor of first reactor stack S1, and is positioned above second reforming reactor 110B, which is the bottommost reforming reactor of first reactor stack S1. Third reforming reactor 110C is the topmost reforming reactor of second reactor stack S2, and is positioned above fourth reforming reactor 110D, which is the bottommost reforming reactor of second reactor stack S2. A reforming reactor system of this disclosure can comprise a single stack, or a plurality of stacks, including, without limitation, two, three, or four reactor stacks. In embodiments, such as the embodiment of FIG. 1, there is conveying of hydrocarbon feed between reactor stacks. In embodiments, there is conveying of reforming catalyst between reactor stacks. In embodiments, there is conveying of both hydrocarbon feed and reforming catalyst between reactor stacks.

The herein-disclosed reforming reactor system comprises a stack of reforming reactors. As is generally understood, a reforming "reaction", typically takes place within a reforming "reactor." The reforming reactor employed in the system and method described herein may be any conventional type of reactor that maintains a catalyst within the reactor and can accommodate a continuous flow of hydrocarbon. The catalytic reactor system described herein may comprise a fixed catalyst bed system, a moving catalyst bed system, a fluidized catalyst bed system, or combinations thereof. Suitable reactors may include, but are not limited to, fixed bed reactors including radial flow reactors, bubble bed reactors, and ebullient bed reactors. The flow of the feed can be upward, downward, or radially through the reactor(s). In various embodiments, the catalytic reactor system described herein may be operated as an adiabatic catalytic reactor system or an isothermal catalytic reactor system. As used herein, a "hydrocarbon stream" comprises hydrocarbons, though components other than molecules comprising hydrogen and carbon may be present in the stream (e.g., hydrogen gas). In some embodiments, a "hydrocarbon" may comprise individual molecules that comprise one or more atoms other than hydrogen and carbon (e.g., nitrogen, oxygen, etc.).

In embodiments, the reforming reactors are radial flow reactors with the hydrocarbon stream passing through the reactors in inward or outward flow. The reactors may be sized according to known techniques, and all of the reactors may be the same size. Alternatively, one or more reactors may be different sizes. For example, in embodiments, as noted herein, the reforming reactor system comprises a CCR retrofitted and/or repurposed for use with an aromatization catalyst as described herein. In embodiments, the stack of reactors may increase in size (i.e., volume) from a topmost reactor to a bottommost reactor. For example, in embodiments, with the total volume of catalyst all of the reforming reactors in the stack being equated to 100%, a two-reactor stack may comprise a first or topmost reactor comprising 30%, 40%, or 50% by volume of the catalyst, and a second or bottommost reactor of the stack may comprise 50%, 60%, or 70% by volume of the catalyst. In alternative embodiments, a three-reactor stack may comprise a first or topmost reactor comprising 10%, 20%, or 30% by volume of the catalyst, a second or middle reactor of the stack may comprise 20%, 30%, or 40% by volume of the catalyst, and a third or bottommost reactor of the stack may comprise 30%, 40%, or 50% by volume of the catalyst. In alternative embodiments, a four-reactor stack may comprise a first or topmost reactor comprising 10%, 20%, or 30% by volume of the catalyst, a second or second reactor of the stack may comprise 20%, 30%, or 40% by volume of the catalyst, a third reactor of the stack may comprise 20%, 30%, or 40% by volume of the catalyst, and a fourth or bottommost reactor of the stack may comprise 30%, 40%, or 50% by volume of the catalyst.

In embodiments, a multi-stack system comprises two stacks, with conveying of catalyst between the stacks, each stack comprising two reforming reactors. In some such embodiments, the volume percentage of the total reforming catalyst (with the total volume of catalyst in all of the reforming reactors of the reforming reactor system being equated to 100%) in the first reactor (topmost reactor of the first reactor stack) is from about 10% to about 30% by volume, where the volume percentage of catalyst in the second reactor (bottommost reactor of the first reactor stack) is from about 10% to about 30% by volume, the volume percentage of catalyst in the third reactor (topmost reactor of the second reactor stack) is from about 10% to about 30% by volume, and the volume percentage of catalyst in the fourth reactor (bottommost reactor of the second reactor stack) is from about 10% to about 30% by volume.

In embodiments, a multi-stack system comprises two stacks, with conveying of catalyst between the stacks, each stack comprising three reforming reactors. In some such embodiments, the volume percentage of the total reforming catalyst (with the total volume of catalyst in all of the reforming reactors of the reforming reactor system being equated to 100%) in the first reactor (topmost reactor of the first reactor stack) is from about 10 to about 30%, the volume percentage of catalyst in the second reactor (middle reactor of the first reactor stack) is from about 10 to about 30%, the volume percentage of catalyst in the third reactor (bottommost reactor of the first reactor stack) is from about 10 to about 30%, the volume percentage of catalyst in the fourth reactor (topmost reactor of the second reactor stack) is from about 10 to about 30%, the volume percentage of catalyst in the fifth reactor (middle reactor of the second reactor stack) is from about 10 to about 30%, and the volume percentage of catalyst in the sixth reactor (bottommost reactor of the second reactor stack) is from about 10 to about 30%.

While under catalytic conditions the activity of a catalyst will decrease as a function of reaction time resulting in a "spent" catalyst, such that while a fresh catalyst had an activity x, the spent catalyst has an activity y, wherein x is greater than y. In an embodiment, the catalytic activity of the spent catalyst may be increased by reactivation of the spent catalyst, resulting in a catalytic activity z, wherein z is greater than y but less than x (y<z<x). Methods of restoring activity to a spent catalyst are described in more detail later herein.

Variation 1: Operation of Reforming Reactors as Stationary Radial Fixed Beds

Within the reforming reactors, hydrocarbon feed is contacted with reforming catalyst. In a first variation of a reforming method according to this disclosure, the stacked reactors are operated as stationary fixed beds, and the reforming catalyst remains fixed during aromatization of the hydrocarbon feed. In such embodiments, the reforming catalyst is not moved during operation of a run. The stacked reactor system may be configured for initial introduction of reforming catalyst into one or more vessels 150B operable as a purge tank or a reduction vessel connected to or with a topmost radial flow reactor of at least one of the at least one reactor stacks, whereby catalyst therein can be stored and/or reduced prior to introduction into first reactor stack S1.

The reforming reactor system may be operated to convert the convertible hydrocarbons in the hydrocarbon feed until the reforming catalyst is determined to be a 'spent' reforming catalyst. In accordance with embodiments of variation one, the reforming catalyst is not moved at all during the run, with the reactors acting as stationary radial fixed beds. In such embodiments, valves V1 to V4 of FIG. 1 can be closed during a run. In this manner, the CCR system can be operated like the conventional AROMAX® process, i.e., using stationary fixed bed radial flow reactors. Via the first variation, an existing CCR can, in embodiments, be utilized for aromatization without making use of the moving bed or catalyst regeneration functions of conventional CCR processes.

The catalyst may be determined to be spent as known in the art. For example, catalyst may be determined to be spent when the outlet temperature of final or fourth reforming reactor 110D rises, for example to a temperature equal to or greater than a threshold temperature that indicates a level of deactivation of the catalyst sufficient to warrant catalyst change out. In another example, the catalyst may be determined to be spent when the selectivity to desired aromatic compounds of final or fourth reforming reactor 110D decreases, for example to a selectivity equal to or less than a threshold selectivity that indicates a level of selectivity loss of the catalyst sufficient to warrant catalyst change out. In embodiments, when utilizing the radial flow reactors as stationary fixed beds, the spent catalyst extracted via used catalyst transfer line 135 has an activity that is less than or equal to about 90%, about 80%, about 70%, about 50%, and about 25% of the optimal activity of fresh catalyst. Once the catalyst is determined to be spent, the introduction of hydrocarbon feed is ceased. The reforming reactors may be purged, for example until the reactor effluent (e.g., the product extracted from fourth reforming reactor 110D via product outlet line 125) comprises less than about 200 ppm, about 100 ppm, about 50 ppm, and about 50 ppm of hydrocarbons. The reforming reactors may be allowed to come to ambient temperature and/or may be cooled to ambient temperature. Ambient temperature may be a temperature of less than or equal to about 60° C., about 50° C., about 40° C., about 30° C., and about 25° C., depending on the geographical location, elevation, and additional factors known to those of skill in the art. Once at the desired temperature, spent reforming catalyst can be removed from within the radial flow reactors of each reactor stack via the bottommost radial flow reactor of each reactor stack or via the bottommost reactor of a final reactor stack with conveying between stacks, with the catalyst flowing downward through the at least one stack of radial flow reactors for removal. For example, spent reforming catalyst can be removed from fourth reactor 110D. In an embodiment, catalyst is removed or emptied via catalyst transfer line 135 from the fourth reactor 110D, followed by third reactor 110C, followed by second reactor 110B (via inter-stack transfer line 134), followed by first reactor 110A (via inter-stack transfer line 134). Fresh reforming catalyst can be introduced to the top of the topmost radial flow reactor of each reactor stack or to the top of the topmost radial flow reactor of the first reactor stack with conveying between stacks, and flow downward through the at least one stack of radial flow reactors. For example, in the embodiment of FIG. 1, fresh catalyst can be introduced via transport line 131, a lock hopper and/or reduction vessel 150B, and first reforming reactor 110A. In an embodiment, catalyst is added or filled via transport line 131 to fourth reactor 110D (via inter-stack transfer line 134), followed by third reactor 110C (via inter-stack transfer line 134), followed by second reactor 110B, followed by first reactor 110A.

The spent reforming catalyst can be removed from the bottommost radial flow reactor through a purge chamber or lock hopper fluidly attached to or with a bottommost radial flow reactor of each reactor stack or a bottommost reactor of a final reactor stack with conveying between stacks prior to removing the spent catalyst from the stacked reactor system. For example, in the embodiment of FIG. 1, spent catalyst can be removed after passage through vessel 150A, which may be a purge vessel or lock hopper.

Spent catalyst within the purge chamber 150A may be purged with a gas comprising hydrogen, or nitrogen. In embodiments, vessel(s) 150A comprise first and second purge chambers fluidly connected in series. In such embodiments, the first purge chamber may be purged with a first purge gas, and the second purge chamber purged with a second purge gas. The first purge gas can comprise hydrogen, the second purge gas can comprise nitrogen, or the first purge gas can comprise hydrogen and the second purge gas comprise nitrogen.

Fresh reforming catalyst may be added to the topmost radial flow reactor via a vessel 150B, which may be a purge chamber, a lock hopper, a reduction vessel, or one or more vessels operable to purge, store, and/or reduce the fresh catalyst prior to introduction into first reforming reactor 110A.

In embodiments, the fresh reforming catalyst is contacted in a purge chamber 150B with a purge gas prior to introducing it into the topmost radial flow reforming reactor. In embodiments, the purge gas comprises nitrogen.

Variation 2: Operation with Slow Movement of Catalyst Through Stacked Reactors and to Regenerator In a second variation of a reforming method according to this disclosure, the radial stacked reactors are not operated as stationary fixed beds, but are operated to provide movement of the reforming catalyst through the at least one reactor stack (e.g., S1 and/or S2) and, via a used or spent catalyst transfer system, to a downstream unit comprising a regeneration system in which the used catalyst is regenerated. In embodiments, the stacked reactor system is operable to provide movement of the reforming catalyst through the at least one reactor stack over a time period of at least about 180 days, about 200 days, about 250 days, about 270 days, about 300 days, about 325 days, about 350 days, about 360 days, about 365 days, or greater than 365 days. In embodiments, the catalyst moves very slowly to a regeneration section. Once in the regenerator, the catalyst can be regenerated, as discussed in more detail hereinbelow, for example via coke burn (e.g., via contact with chlorine and oxygen), metal (e.g., platinum) redispersion, and halogenation (e.g., fluorine for refluorination). The regenerated catalyst can then be returned to the stacked reforming reactor section.

Although referred to as used or 'spent' catalyst, the catalyst removed via used catalyst transfer line 135 may retain substantial catalytic activity. In embodiments, when operating the radial flow reactors with continuous movement of catalyst (via the second or third variations described herein), the spent catalyst extracted via used catalyst transfer line 135 has an activity y that is less than or equal to about 90%, about 80%, about 70%, about 50%, about 10%, or about 5% percent the activity "x" of fresh catalyst. In aspects, an operation catalyst with up to about 50% reduced catalyst activity, about 80% reduced catalyst activity, and about 95% reduced catalyst activity may initially be dumped.

In embodiments, the herein-disclosed reforming method comprises extracting used reforming catalyst, which may also pass through at least one purge vessel attached to or fluidly connected with the bottommost reforming reactor of each reactor stack or the bottommost reforming reactor of the final reactor stack with conveying between stacks, and replacing it with replacement catalyst, which is added back into the topmost reforming reactor of each reactor stack or the topmost reforming reactor of the first reactor stack with conveying between stacks, and may also pass through at least one purge vessel and/or at least one reduction vessel prior to introduction into the topmost reactor.

Stacked reactor system 100 comprises used or 'spent' catalyst transport line or conveyance system 135. Used or spent catalyst may be removed from the last or bottommost reactor, fourth reactor 110D, of second reactor stack S2 via used or 'spent' catalyst transport line or conveyance system 135. The used or spent catalyst may pass through one or more vessels 150A, prior to conveyance to downstream unit 140.

In embodiments, the catalyst transfer system transfers the reforming catalyst through at least one purge chamber or lock hopper attached to the bottommost radial flow reactor of each of the at least one reactor stacks or the bottommost radial flow reactor of a final of the at least one reactor stacks with conveying between stacks. Used catalyst transfer system 135 may be operated to transfer catalyst from bottom-most radial flow reforming reactor 110D through purge vessel or lock hopper 150A. Vessel 150A may be integrated with fourth reforming reactor 110D, or, as indicated in embodiments of FIG. 1, may be connected therewith via used catalyst conveyance system 135. In embodiments, the movement of the reforming catalyst through the at least one reactor stack to a purge vessel or lock hopper 150A occurs over a time period of at least about 180 days, about 270 days, about 365 days, or greater than 365 days.

Spent catalyst conveyance system 135 may fluidly connect at least one purge chamber 150A with a top of a regeneration system 140. Spent catalyst conveyance system 135 may be operable to transfer catalyst using either pneumatical or non-pneumatical methods, using but not limited to methods using one or more of conveyor belts, screws, shuttle hoppers and supersacks, as well as pneumatic methods utilizing one or more of air, hydrogen, nitrogen, argon, and additional, inert or non-inert commercial gases. Movement of the spent reforming catalyst through the conveyance system 135 to the regeneration system 140 can be continuous, intermittent, or batch-wise. In embodiments, extracting of the spent reforming catalyst from the at least one reactor stack (e.g., S1 and/or S2), and regenerating of the spent reforming catalyst in the regeneration system 140 are performed batchwise.

In embodiments, the reforming catalyst in one stack of the at least one stack of radial flow reactors (e.g., S1 and/or S2) is transferred via the spent catalyst conveyance system 135 to the regeneration system every about 180 days, about 270 days, about 365 days, or greater than 365 days. Spent catalyst continuously, semi-continuously, or batch-wise introduced into regenerator 140 may be regenerated therein when an amount of spent catalyst stored in the regenerator reaches a predetermined threshold amount.

As noted herein, via this second variation, downstream unit 140 comprises a regenerator or regeneration system operable to regenerate spent catalyst. Via regeneration, the catalytic activity of the spent catalyst introduced into regeneration system 140 via spent catalyst transfer line 135 may be increased by reactivation of the spent catalyst, resulting in a catalytic activity z, wherein z is greater than y (the activity of the spent catalyst) but less than the activity of fresh catalyst "x" (where y<z<x).

In embodiments, the internals of the regenerator are not coated with a metal protective layer comprising tin, which may also be referred to as tin MPT. While tin MPT coating may be beneficial in some systems and methods for, e.g., preventing the carburization of components and/or vessels in the process, its presence in the regenerator could disadvantageously result in varying degrees of catalyst poisoning. In embodiments, the interior surface of the regeneration reactors and/or the reactor internals of the regenerator are not coated with a tin MPT. In embodiments, the interior surface of the regeneration reactors and/or the reactor internals of the regenerator are coated with a tin MPT.

In embodiments, the spent aromatization catalyst introduced into regeneration system or regenerator 140 is regenerated by any methods known of those to skill in the art. Material(s) utilized to regenerate the spent catalyst are introduced into regeneration system or vessel(s) 140 via line(s) 141. Regeneration waste gases may be removed from regeneration vessel(s) or system 140 via regeneration waste gas outlet line(s) 142. In embodiments, the regeneration process comprises decoking, halogenation, reduction, or a combination thereof. In embodiments, the aromatization catalyst comprises a catalyst support, one or more catalytically active metals, and at least one halide. In embodiments, the aromatization catalyst comprises a catalyst support, one or more catalytically active metals, and at least two halides. In embodiments, the reforming catalyst comprises a Group VIII metal, a zeolitic support, and at least one halogen. In embodiments, the at least one halogen comprises fluorine, and the regenerator is operable to refluorinate the spent reforming catalyst. Such aromatization catalysts are detailed further herein.

In embodiments, regenerating comprises reducing the amount of carbonaceous material present in the spent catalyst, redispersing a metal about the catalyst support, and reactivating the catalyst to restore at least a portion of the catalytic activity. In embodiments, the regeneration process comprises decoking, oxychlorination, fluorination, reduction, or a combination thereof. Such methods of regeneration are described, by way of non-limiting examples, in U.S. Pat. Nos. 8,664,144 and 9,421,529, the disclosure of each of which is hereby incorporated herein in its entirety for all purposes not contrary to this disclosure.

In embodiments, the regeneration process comprises chlorination, decoking, fluorination, reduction, or a combination thereof. Such methods of regeneration are described, by way of non-limiting examples, in U.S. patent application Ser. No. 14/230,373; U.S. Pat. Nos. 8,716,161; 8,912,108; 9,174,895; and 9,421,530, each of which is hereby incorporated by reference. In embodiments, the fluorination comprises low temperature fluorination. Such a method of regeneration is described, by way of non-limiting example, in U.S. Pat. No. 10,300,476, the disclosure of which is hereby incorporated herein in its entirety.

In embodiments, the used catalyst is first contacted with chlorine and oxygen in order to burn coke and redisperse platinum. Regeneration can further comprise the addition of fluorine.

Regenerating Catalyst

As noted above, regenerating the spent catalyst may comprise reducing the amount of carbonaceous material present in the spent catalyst. Regeneration may further comprise redispersing the metal about the catalyst support. The metal may be redispersed via contact with one or more redispersing compounds. The metal may be redispersed about the periphery of the catalyst, in one or more layers of the catalyst (e.g., a skin layer), throughout the catalyst, or various combinations thereof, and such dispersion may be uniform or non-uniform. The metal in the catalyst support may then be reactivated by contacting the material with a reactivating composition. The reactivating composition may comprise one or more halides. Regeneration may further comprise thermal treatment of the composition. Although various decoking, redispersing, and reactivating steps are described in a certain order herein, such steps may be reordered as per the U.S. patents described and incorporated herein by reference.

Reducing the amount of carbonaceous material associated with the catalyst may also be referred to as decoking. Decoking involves conversion of the carbonaceous material to carbon oxides and water and may be carried out by heating the spent catalyst in a temperature ranging of from about 25° C. to about 1000° C., alternatively from about 50° C. to about 900° C., alternatively from about 100° C. to about 800° C., alternatively from 200° C. to 700° C., alternatively from 300° C. to 600° C. to produce a decoked spent catalyst. The decoking process may be carried out by heating the spent catalyst for a time of from about 1 hours to about 40 hours, alternatively from about 2 hours to about 25 hours, alternatively from about 3 hours to about 20 hours, alternatively from 4 hours to 15 hours, alternatively from 5 hours to 10 hours to produce a decoked spent catalyst. The decoking process may be carried out by heating the spent catalyst in the presence oxygen, the oxygen concentration being from about 0.01 mol % to about 20 mol % alternatively from about 0.1 mol % to about 15 mol % alternatively from about 0.2 mol % to about 10 mol % alternatively from 0.5 mol % to 5 mol % alternatively from 1 mol % to 3 mol % to produce a decoked spent catalyst.

Regenerating may comprise redispersing a metal on the catalyst support. In embodiments, the metal on the decoked spent catalyst is redispersed on the catalyst support following decoking of the spent catalyst. While not wishing to be bound by theory, the decoking process described previously, and/or the hydrocarbon conversion process that the spent catalyst was subjected to, may disadvantageously lead to the agglomeration of the metal on the catalyst support. The agglomerated metal is not fully available physically and chemically to the catalytic reactions and thus should be redispersed if maximum catalyst activity is to be restored. In embodiments, the metal on the spent catalyst (which may be a decoked spent catalyst at this point) is redispersed by a number of processes generally referred to as oxychlorination. Oxychlorination of the spent catalyst may be carried out by contacting the spent catalyst with a redispersing composition of the type and under the conditions described herein.

In an embodiment, the spent catalyst is contacted with a redispersing composition comprising a chorine-containing compound and oxygen. The chlorine-containing compound may be in the solid phase, liquid phase, gas phase, or combinations thereof. Examples of chlorine-containing compounds suitable for use in the redispersing composition include without limitation hydrochloric acid, chlorine, carbon tetrachloride, tetrachloroethylene, chlorobenzene, methyl chloride, methylene chloride, chloroform, allyl chloride, trichloroethylene, chloramine, chlorine oxides, chlorine acids, chlorine dioxide, dichlorine monoxide, dichlorine heptoxide, chloric acid, perchloric acid, or combinations thereof.

Contacting of the spent catalyst with the redispersing composition may be carried out over a time period of from about 0.5 hours to about 50 hours, alternatively from about 1 hour to about 20 hours, alternatively from about 2 hours to about 10 hours, at a temperature in the range of from about 25° C. to about 1000° C., alternatively from about 50° C. to about 900° C., alternatively from about 100° C. to about 800° C., alternatively from about 200° C. to about 400° C., alternatively from about 400° C. to about 600° C. Contacting of the spent catalyst with the redispersing composition may be carried out in the presence of oxygen. When oxygen is used the oxygen concentration used is from about 0.01 mol % to about 20 mol %, alternatively from about 1 mol % to about 18 mol %, alternatively from about 5 mol % to about 15 mol %, alternatively from about 8 mol % to about 12 mol %.

In an alternative embodiment, the spent catalyst is contacted with a redispersing composition comprising a chorine-containing compound of the type described herein (e.g., HCl) and oxygen in the presence of water. When water is used, the water to HCl mole ratio ($H_2O$:HCl) may be from about 0.01:1 to about 10:1, alternatively from about 0.5:1 to about 5:1, alternatively from about 1:1 to about 3:1. When chorine-containing compounds are used other than HCl, the $H_2O$:HCl mole ratio is calculated based on the equivalent amount of HCl generated in the presence of the spent catalyst.

In an embodiment, a weak base may be included while the metal is being redispersed in order to neutralize any free acids that may be present. An example of weak base suitable for use in this disclosure includes without limitation ethylene diamine (EDA). The resulting material is a redispersed spent catalyst which may be further dried under suitable conditions. In addition, or in the alternative the spent catalyst (e.g., the decoked and/or redispersed spent catalyst) may be calcined in a temperature range of from about 25° C. to about 1000° C., alternatively from about 50° C. to about 900° C., alternatively from about 100° C. to about 800° C., alternatively from about 200° C. to about 700° C., alternatively from about 300° C. to about 600° C. The calcination may be carried out for a time of from about 1 hour to about 40 hours, alternatively from about 2 hours to about 25 hours, alternatively from about 3 hours to about 20 hours, alternatively from about 4 hours to about 15 hours, alternatively from about 5 hours to about 10 hours. The calcination process may be carried out by heating the spent catalyst in the presence of oxygen, the oxygen concentration being from about 0.01 mol % to about 20 mol % alternatively from about 0.1 mol % to about 15 mol % alternatively from about 0.2 mol % to about 10 mol % alternatively from about 0.5 mol % to about 5 mol % alternatively from about 1 mol % to about 3 mol %.

The spent catalyst (e.g., the decoked, redispersed, calcined, and/or untreated spent catalyst) may be subjected to at least one reactivation step. Reactivation of the spent catalyst may be carried out using a reactivating composition comprising one or more halogenating agents, including gas phase halogenating agents, liquid phase halogenating agents, solid phase halogenating agents, or combinations thereof. In an embodiment, reactivation of the spent catalyst is carried out by contacting the spent catalyst with a fluorine-containing solution a process generally referred to as fluoridation. The fluorine-containing compound may be in the solid phase, liquid phase, gas phase, or combinations thereof. Examples of fluorine-containing compounds suitable for use in this disclosure include without limitation tetramethylammonium fluoride (TMAF), ammonium fluoride ($NH_4F$ or AF), tetrafluoroethylene, 2,2,2-trifluoroethanol (TFE), fluorine ($F_2$), hydrofluoric acid (HF), or combinations thereof. In an embodiment, the fluorine-containing compound is a perfluorinated alkane, perfluorinated alcohol or mixtures thereof. Examples of perfluorinated alcohols suitable for use in this disclosure include without limitation 2,2,2-trifluoroethanol (TFE), hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, and combinations thereof.

In an embodiment, the fluorine-containing compound is an organic ammonium halide compound and may comprise one or more compounds represented by the general formula $N(R)_4F$, where R represents a hydrogen or a substituted or unsubstituted carbon chain molecule having from 1 to 20 carbons wherein each R may be the same or different. In an embodiment, R is methyl, ethyl, propyl, butyl, or combinations thereof. Alternatively, R is a methyl group. Examples of suitable organic ammonium compounds include ammonium fluoride (AF), tetramethylammonium fluoride (TMAF), tetraethylammonium fluoride (TEAF), tetrapropylammonium fluoride, tetrabutylammonium fluoride, methyltriethylammonium fluoride, or combinations thereof. Alternatively, the organic ammonium halide compound may also comprise at least one hydrofluoric acid and at least one ammonium hydroxide represented by the formula N(R')$_4$OH, where R' is hydrogen or a substituted or unsubstituted carbon chain molecule having from 1 to 20 carbon atoms wherein each R' may be the same or different. In an embodiment, R' is methyl, ethyl, propyl, butyl, or combinations thereof. Alternatively, R' comprises a methyl group. Examples of organic ammonium hydroxides suitable for use in this disclosure include ammonium hydroxide, tetraalkylammonium hydroxides such as tetramethylammonium hydroxide, tetraethylammonium hydroxide, tetrapropylammonium hydroxide, tetrabutylammonium hydroxide, or combinations thereof.

In an embodiment the spent catalyst (e.g., the decoked, redispersed, calcined, and/or untreated spent catalyst) is contacted with a solution of TMAF in the temperature range of from about 0° C. to about 200° C., alternatively from about 20° C. to about 100° C., alternatively from about 40° C. to about 60° C. for a time period of from about 1 minute to about 100 hours, alternatively about 0.1 hours to about 50 hours, alternatively from about 1 hour to about 24 hours. The solution also contains any suitable solvent.

In an alternative embodiment, the spent catalyst is reactivated by contacting with a gas phase fluoridating agent such as, for example, fluorine. In such an embodiment, the gas phase fluoridating agent may be contacted with a spent catalyst for a time period of from about 1 minute to about 100 hours, alternatively from about 0.1 hours to about 50 hours, alternatively from about 1 hour to about 24 hours, alternatively from about 4 hours to about 11 hours.

In an alternative embodiment, the spent catalyst is reactivated by contacting with a solid phase fluoridating agent such as an organic ammonium halide compound for example ammonium fluoride, tetramethylammonium fluoride, or combinations thereof. In such an embodiment, the solid phase fluoridating agent may be contacted with a spent catalyst at elevated temperatures. The contacting may occur for a time period of from about 1 minute to about 100 hours, alternatively from about 0.1 hours to about 50 hours, alternatively from about 1 hour to about 24 hours, alternatively from about 4 hours to about 11 hours. The elevated temperatures may in the temperature range of from about 0° C. to about 200° C., alternatively from about 20° C. to about 100° C., alternatively from about 40° C. to about 60° C. While not wishing to be limited by theory it is believed that under these conditions some of the solid phase fluoridating agent sublimes and migrates into the spent catalyst (e.g., into the decoked, redispersed, calcined, and/or untreated spent catalyst).

In the reactivation of the spent catalyst, a chorine-containing compound may also be utilized. The chlorine-containing compound may be in the solid phase, liquid phase, gas phase, or combinations thereof. In an embodiment, the chlorine-containing compound is of the type previously described herein. Examples of chlorine-containing compounds suitable for use in the reactivating composition include without limitation compounds represented by the general formula N(R)$_4$Cl, where R represents a hydrogen or a substituted or unsubstituted carbon chain molecule having 1 to 20 carbons wherein each R may be the same or different. In an embodiment, R is methyl, ethyl, propyl, butyl, or combinations thereof. Alternatively, R is a methyl substituent. Specific examples of suitable organic ammonium chlorine compounds include ammonium chloride, tetramethylammonium chloride (TMAC), tetraethylammonium chloride, tetrapropylammonium chloride, tetrabutylammonium chloride, methyltriethylammonium chloride, or combinations thereof. Alternatively, the chorine-containing compound is TMAC.

In any of the aforementioned methods for reactivating the spent catalyst, the resulting composition may be dried in a temperature range of from about 0° C. to about 250° C., alternatively from about 25° C. to about 200° C., alternatively from about 50° C. to about 150° C. and/or calcined in a temperature range of from about 25° C. to about 1000° C., alternatively from about 50° C. to about 900° C., alternatively from about 100° C. to about 800° C. The drying and or calcining may occur at ambient pressures, or under a vacuum. During the drying and/or calcining the contacted spent catalyst particles may be stationary, or moving, for example in a rotary dryer. In an embodiment, a weak base may be included during the reactivation of the metal to neutralize free acids that may be present. An example of weak base suitable for use in this disclosure includes without limitation EDA. Following fluoridation, the resulting composition may be a decoked, redispersed, reactivated spent catalyst.

In embodiments, the spent catalyst (e.g., a decoked, redispersed, and/or reactivated spent catalyst) is subjected to multiple reactivation steps. The reactivation steps may be the same, alternatively the reactivation steps may differ. For example, a spent catalyst (e.g., a decoked and/or redispersed spent catalyst) may be subjected to multiple reactivations with a gas phase fluoridating agent. Alternatively, a spent catalyst may be subjected to a first reactivation with a liquid phase fluoridating agent and a second reactivation with a gas phase fluoridating agent. In an embodiment, the spent catalyst is subjected to two reactivation steps.

The spent catalyst (e.g., the decoked, redispersed, and/or reactivated spent catalyst) can be thermally treated as described previously herein to produce a thermally treated spent catalyst. Thermal treatment may be carried out in stationary or flowing gas (i.e., hydrogen, oxygen, air, helium, nitrogen, argon, etc.). For example, the thermal treatment may be carried out in a flowing gas comprising nitrogen and/or oxygen, air, nitrogen diluted air, or combinations thereof. In an embodiment, the thermal treatment comprises calcination and the calcination process may be carried out by heating the spent catalyst in the presence of oxygen, the oxygen concentration being from about 0.01 mol % to about 20 mol % alternatively from about 0.1 mol % to about 18 mol % alternatively from about 0.2 mol % to about 15 mol %, alternatively from about 1 mol % to about 11 mol %, alternatively from about 4 mol % to about 9 mol %. In an embodiment, the spent catalyst is thermally treated by calcining in a temperature range of from about 25° C. to about 1000° C., alternatively from about 50° C. to about 900° C., alternatively from about 100° C. to about 800° C., alternatively from about 200° C. to about 700° C., alternatively from about 300° C. to about 600° C. The calcination may be carried out for a time of from about 1 hour to about 40 hours, alternatively from about 2 hours to about 25 hours, alternatively from about 3 hours to about 20 hours, alternatively from about 4 hours to about 15 hours, alternatively from about 5 hours to about 10 hours. The calcination process may be carried out by heating the spent catalyst in the presence of oxygen, the oxygen concentration being from about 0.01 mol % to about 20 mol % alternatively from about 0.1 mol % to about 15 mol % alternatively from about 0.2 mol % to about 10 mol % alternatively from about 0.5 mol % to about 5 mol % alternatively from about 1 mol % to about 3 mol %. Upon completion of a regeneration process described herein, the catalyst is referred to as a regenerated or reactivated catalyst.

In accordance with the present disclosure, the activity of the reactivated catalyst may be denoted z while that of the fresh catalyst is denoted by x, where x is greater than z. In an embodiment, the reactivated catalyst may have an activity z of from about 0.001x to about 0.95x, alternatively from about 0.7x to about 0.95x, alternatively from about 0.8x to about 0.95x, alternatively about 0.95x.

After the herein described regeneration, the metal may be present in the regenerated catalyst in an amount from about 0.1 wt. % to about 50 wt. % by total weight of the spent catalyst, alternatively from about 0.1 wt. % to about 10 wt. %, alternatively from about 0.2 wt. % to about 5 wt. %, alternatively from about 0.3 wt. % to about 3 wt. %, alternatively from about 0.3 wt. % to about 2 wt. %. As used herein, the weight percentage of metals are based on the total weight of the catalyst. Chloride may be present in the regenerated catalyst in an amount of from about 0.1 wt. % to about 10 5 wt. % by total weight of the catalyst, alternatively from about 0.2 wt. % to about 5 3 wt. %, alternatively from about 0.3 wt. % to about 3 2 wt. %. Fluoride may be present in the regenerated catalyst in an amount of from about 0.1 wt. % to about 10 wt. % by total weight of catalyst, alternatively from about 0.2 wt. % to about 5 wt. %, alternatively from about 0.3 wt. % to about 3 wt. %, alternatively from about 0.6 wt. % to about 2 wt. %.

In embodiments, regeneration system 140 is operable to provide movement of the reforming catalyst through a series of radial flow regeneration reactors. The regeneration reactors may be stacked reactors operable to provide a substantially even distribution of regeneration components (e.g., halogen). Passage of catalyst through such a stack(s) of regeneration vessels will be substantially faster than passage through the stack(s) of reforming reactors (e.g., taking on the order of a week for catalyst to pass through the regeneration reactors, and a year or more, as noted herein, for catalyst to pass through the reforming reactors).

The regenerated reforming catalyst can be introduced into the topmost radial flow reactor of each of the at least one reactor stacks or to the topmost radial flow reactor of a first reactor stack with conveying between stacks. The regenerated reforming catalyst can be introduced to the topmost radial flow reactor via vessel 150B (e.g., at least one purge chamber) and replacement catalyst conveyance system or transport line 131. The regenerated catalyst may be reduced prior to or after conveyance to the top of the at least one reactor stack. In embodiments, vessel(s) 150B comprise a reduction vessel integrated and/or fluidly connected with the topmost radial flow reactor to which regenerated catalyst is introduced (e.g., first reactor 110A), and regenerated catalyst is reduced in vessel 150B. In embodiments, the regenerated catalyst is reduced via a reducing gas comprising hydrogen, nitrogen, carbonaceous reducing gases such as carbon monoxide (CO), or mixtures thereof. In embodiments, vessel(s) 150B comprise a purge vessel integrated and/or fluidly connected with the topmost radial flow reactor to which regenerated catalyst is introduced, and regenerated catalyst is contacted therein with a purge gas. In embodiments, the purge gas comprises nitrogen. In embodiments, a single vessel 150B is utilized as a purge vessel, lock hopper, and/or reducing vessel.

In embodiments, the reforming catalyst passes through the regeneration system, and back to the stacked reactor system (e.g., to vessel 150B) via the replacement catalyst transfer system over a time period of about a week. At the start of a run, initial fresh catalyst may be introduced into downstream vessel or storage unit 140 via, for example, make-up catalyst line 130 and valve V4, and on to the stacked reactors of first stack S1, for example via vessel(s) 150B, in which the fresh catalyst may be purged and/or reduced. Alternatively, fresh catalyst may be purged and/or reduced within downstream vessel(s) 140 prior to being transferred to the stacked reactors of first stack S1.

For this second variation, during operation, valves V1 and V2 may be open, with valve V3 directing catalyst flow to first reforming reactor 110A, and valve V4 closed. In this manner, as discussed above, reforming catalyst can move from first reforming reactor 110A through all the reforming reactors (e.g., from 110A to 110B via line 134 to 110C to 110D and exiting 110D via line 135), as described hereinabove, and on to regeneration unit 140. At the regeneration unit, the used catalyst can be regenerated. Fresh make-up catalyst may be introduced into the stacked reactors via make-up catalyst line 130 and valve V4, as desired, and spent catalyst purged via catalyst purge line 132 and valve V3. Following regeneration (which may take on the order of a few days to a week, in embodiments), the regenerated catalyst can be returned to first reforming reactor 110A, optionally via vessel 150B, in which catalyst may be stored and/or reduced until needed for use in first reactor 110A.

As depicted in the embodiment of FIG. 1, hydrocarbon feed may pass from the topmost radial flow reactor of each stack to the bottommost radial flow reactor thereof, such that reforming catalyst and hydrocarbon feed flow co-currently through the at least one reactor stack. In such embodiments, an operating temperature a given radial flow reactor can be lower than an operating temperature of a radial flow reactor downstream of the topmost radial flow reactor. For example, in embodiments such as that of FIG. 1, first reforming reactor 110A may be operated at a lower temperature than second reforming reactor 110B, which may be operated at a lower temperature than third reforming reactor 110C, which itself may be operated at a lower temperature than fourth reforming reactor 110D. In alternative embodiments, the CCR or stacked reactor system is configured for passage of hydrocarbon feed from a bottommost reactor of the at least one reactor stack to a topmost reactor thereof, such that reforming catalyst and hydrocarbon feed flow counter-currently through the at least one reactor stack. Such counter-current flow of catalyst and hydrocarbon feed is described in more detail herein with reference to embodiments disclosed in FIG. 2.

Variation 3: Operation with Slow Movement of Catalyst Through Stacked Reactors and to Storage/Removal In a third variation of a reforming method according to this disclosure, the radial stacked reactors are operated to provide movement of the reforming catalyst through the at least one reactor stack and, via the used or spent catalyst transfer system, to a downstream unit for storage and subsequent removal. In such embodiments, reforming catalyst may be moved very slowly to an existing downstream regeneration section. Once there, the spent reforming catalyst is removed from the process and replaced with fresh catalyst which is added back into the stacked reforming reactor section. The downstream unit may be a dedicated storage vessel, or a regeneration system of a retrofitted CCR system, which is used for storage in these embodiments. In such embodiments, passage of the spent catalyst to downstream unit 140 may be as described hereinabove with regard to passage of the spent catalyst to a regeneration system 140. In these embodiments, spent catalyst may be stored in downstream unit 140 until an amount of spent catalyst stored in the regenerator reaches a predetermined threshold amount, at which time, the spent catalyst may be removed therefrom, for example via catalyst dump line 132 and valve V3. The removed spent catalyst may be sent to an offsite facility for regeneration or may be sent for reclamation or disposal. Off-site regeneration may include the addition of liquid to the catalyst.

Fresh catalyst may be introduced into the stacked reactors via catalyst replacement line 131. The fresh catalyst may be introduced into downstream vessel or storage unit 140 via, for example, make-up catalyst line 130 and valve V4. As noted hereinabove, the stacked reactor system may be configured for initial introduction of reforming catalyst into a purge tank or vessel optionally connected to or fluidly connected with a reduction vessel connected to or fluidly connected with a topmost radial flow reactor of at least one of the at least one reactor stacks. In embodiments, fresh reforming catalyst is introduced into the at least one reactor stack via such a purge vessel (e.g., lock hopper) and/or reduction vessel, and purged and/or reduced as described hereinabove prior to introduction into the at least one reactor stack (e.g., the first reactor 110A or reactor stack S1).

For this third variation, during operation, valves V1 and V2 may thus be open while valve V3 can periodically direct catalyst from the regenerator 140 to the catalyst dump via line 132. Valve V4 can be operated to periodically add fresh catalyst to downstream unit 140. In embodiments, the fresh catalyst is dried and/or reduced (in downstream unit 140 and/or vessel(s) 150B) before being fed to first reforming reactor 110A. In embodiments, the aromatization catalyst makes its way through all of the reactors of the stack(s) before proceeding to downstream unit 140 (e.g., from 110A to 110B via line 134 to 110C to 110D and exiting 110D via line 135). According to this third variation of a method of reforming according to this disclosure, rather than being regenerated in downstream unit 140, the used catalyst stored therein may be sent for disposal. In accordance with aspects of the third variation, an existing CCR can, in embodiments, be utilized for aromatization without making use of the catalyst regeneration functions of conventional CCR processes.

In embodiments, after disposal of the spent catalyst, new or fresh catalyst is loaded into downstream unit 140. As with the second variation described above, this third variation may provide for simplified operations, as the plant may have substantially steady state overall catalyst performance, may provide predictable continuous catalyst demand, and enable reforming catalyst replacement without plant shutdown, as replacement catalyst can be introduced to first reactor 110A from a lock hopper 150B during regeneration (in accordance with aspects of variation two) or disposal (in accordance with aspects of variation three) of spent catalyst from downstream vessel 140. As with the second variation, the aromatization catalyst may move very slowly through the stacked reactors, taking from 1-3 years, in embodiments, to move from first reactor 110A to the regenerator/storage vessel 140 or a lock hopper 150A.

Operation with catalyst movement via variations two and three described herein may provide a gradient of catalyst age across the reforming reactors (e.g., with fresh catalyst being introduced at the inlet to reactor 110A and traveling through reactors 110A, 110B, 110C, and 110D while being sequentially used up and exiting the last reactor 110D as a spent catalyst). In embodiments, the temperatures of the reforming reactors are adjusted according to the different levels of activity of the catalyst therein. In embodiments, the operating temperature in each of the reforming reactors is not increased substantially over the course of a run, but remains substantially constant. As described hereinabove with reference to the second variation, and discussed in more detail herein with reference to the embodiment of FIG. 2, hydrocarbon feed and catalyst may flow co-currently, as depicted in the embodiment of FIG. 1, or counter-currently, and desired operating temperatures in the stacked reforming reactors can be selected accordingly.

For this third variation of reforming according to this disclosure, since the spent catalyst may be replaced with fresh catalyst following its transfer to the regenerator/storage unit, and rather than being regenerated therein for re-use, suitable aromatization catalyst may be less attrition resistant than a conventional CCR reforming catalyst, including catalyst characterized by one or more of a crush strength of at least about 1.5 lbs/mm, and/or a catalyst attrition of less than about 3.0 wt. %. Furthermore, as the catalyst is removed from the system according to this third variation, extrudates, which may generate fines, may also be suitable given that the fines are removed along with spent catalyst upon traversing the reactor stacks S1 and S2.

Both the second or third variations provided herein, which employ slow movement of aromatization catalyst through at least one reactor stack, may be operable to provide more effective utilization of AROMAX® catalyst and/or more uniform catalyst demand than provided via conventional fixed bed radial flow reforming reactors. Variations two and three may also provide for more effective catalyst utilization than variation one, in which the reforming reactors of the stacked reactor system are operated as stationary fixed bed radial flow reactors. Thus, the 'spent' catalyst removed from the reactor stack(s) operated via variation two or three may, in embodiments, retain less catalytic activity (e.g., may be more fully spent) than a corresponding catalyst removed from a reactor stack(s) wherein the reactors are operated as stationary fixed beds via variation one (due to the nature of reactant flow through a fixed radial bed). In some aspects, the 'spent' catalyst removed from each of the reactors operated via variation two or three may have substantially the same activity (i.e., substantially uniform catalyst usage), while the 'spent' catalyst removed from more upstream reactors of a system operated via variation one may retain more catalytic activity than the 'spent' catalyst removed from later reactors. In additional embodiments, the 'spent' catalyst removed from each of the reactors may be characterized by varying catalytic activity levels due to, for example, non-uniform catalyst usage.

Another stacked reactor system for use in the herein-disclosed aromatization method will now be described with reference to FIG. 2, which is a flow diagram of a stacked reactor system 200 for use in an aromatization process according to another embodiment of this disclosure. Stacked reactor system 200 comprises first reactor stack S1 and second reactor stack S2, heat exchanger 220, catalyst silo and/or activator 240, spent catalyst storage vessel 250, and valves V1, V2, V3, V4, V5, and V6. In aspects of the disclosed technology, a heat exchanger may be associated with or comprise a component of, for instance, a furnace, or may be incorporated into the system as, e.g., a heat exchanger lacking one or more components associated with a furnace as known to those skilled in the relevant art.

Reforming reactor system 200 comprises first reactor stack S1 comprising three reforming reactors, first, third, and fifth reforming reactors 210A, 210C, and 210E, respectively, and second reactor stack S2 comprising three reforming reactors, second, fourth, and sixth reforming reactors 210B, 210D, and 210F, respectively. In this embodiment, first reforming reactor 210A is the bottommost reforming reactor of first reactor stack S1, and is positioned below third reforming reactor 210C, which is the middle reforming reactor of first reactor stack S1. Fifth reforming reactor 210E is the topmost reforming reactor of first reactor stack S1 and is positioned above third reforming reactor 210C. Second reforming reactor 210B is the bottommost reforming reactor of second reactor stack S2, and is positioned below fourth reforming reactor 210D, which is the middle reforming reactor of second reactor stack S2. Sixth reforming reactor 210F is the topmost reforming reactor of second reactor stack S2 and is positioned above fourth reforming reactor 210D. As discussed hereinabove, a reforming reactor system of this disclosure can comprise a single stack, or a plurality of stacks, including, without limitation, two, three, or four reactor stacks. In embodiments, such as the embodiment of FIG. 2, a reforming system comprises two stacks, and there is conveying of hydrocarbon feed between reactor stacks. In embodiments (e.g., FIG. 1), there is conveying of reforming catalyst between reactor stacks. In embodiments, such as that of FIG. 2, there is not conveying of reforming catalyst between reactor stacks.

In embodiments, hydrocarbon fed to be aromatized is heated to a desired operating temperature by introduction, via hydrocarbon feed inlet line 205, through heat exchanger 220. First reactor inlet line 206 carries heated hydrocarbon feed into first reforming reactor 210A of first reactor stack S1. Within first/bottommost reforming reactor 210A, convertible hydrocarbons are converted to reformer product comprising BTX, via contact with an aromatization catalyst and under operating conditions as described herein. Effluent comprising aromatic hydrocarbons is removed from first reforming reactor 210A via first reactor effluent line 207. The first reactor effluent is introduced into heat exchanger 220 via first reactor effluent line 207, wherein it is heated to the desired downstream reforming reactor inlet temperature. Heated first reactor effluent is introduced from heat exchanger 220 into second reforming reactor 210B of second reactor stack S2 via second reforming reactor inlet line 208.

Within second reforming reactor 210B, convertible hydrocarbons are converted (via reforming/aromatization) to reformer product comprising BTX, via contact with an aromatization catalyst and under operating conditions as described herein. Effluent comprising aromatic hydrocarbons is removed from second reforming reactor 210B via second reforming reactor effluent line 209. The second reactor effluent is introduced into heat exchanger 220 via second reforming reactor effluent line 209, wherein it is heated to the desired downstream reforming reactor inlet temperature. Heated second reactor effluent is introduced from heat exchanger 220 into third reforming reactor 210C of first reactor stack S1 via third reforming reactor inlet line 216.

Within third reforming reactor 210C, convertible hydrocarbons are converted to reformer product comprising BTX, via contact with an aromatization catalyst and under operating conditions in accordance with the present disclosure. Effluent comprising aromatic hydrocarbons is removed from third reforming reactor 210C via third reforming reactor effluent line 217. The third reactor effluent is introduced into heat exchanger 220 via third reforming reactor effluent line 217, wherein it is heated to the desired downstream reforming reactor inlet temperature. Heated third reactor effluent is introduced from heat exchanger 220 into fourth reforming reactor 210D via fourth reforming reactor inlet line 218.

Within fourth reforming reactor 210D, convertible hydrocarbons are converted to reformer product comprising BTX, via contact with an aromatization catalyst and under operating conditions in accordance with the disclosure. Effluent comprising aromatic hydrocarbons is removed from fourth reforming reactor 210D of second reactor stack S2 via fourth reforming reactor effluent outlet line 219. The fourth reactor effluent is introduced into heat exchanger 220 via fourth reforming reactor effluent line 219, wherein it is heated to the desired downstream reforming reactor inlet temperature. Heated fourth reactor effluent is introduced from heat exchanger 220 into fifth reforming reactor 210E via fifth reforming reactor inlet line 221.

Within fifth reforming reactor 210E, convertible hydrocarbons are converted to reformer product comprising BTX, via contact with an aromatization catalyst and under operating conditions in accordance with the present disclosure. Effluent comprising aromatic hydrocarbons is removed from fifth reforming reactor 210E of first reactor stack S1 via fifth reforming reactor effluent outlet line 222. The fifth reactor effluent is introduced, via fifth reforming reactor effluent line 222, into heat exchanger 220, wherein it is heated to the desired downstream reforming reactor inlet temperature. Heated fifth reactor effluent is introduced from heat exchanger 220 into sixth reforming reactor 210F of second reactor stack S2 via sixth reforming reactor inlet line 223.

Within sixth reforming reactor 210F, convertible hydrocarbons are converted to reformer product comprising BTX, via contact with an aromatization catalyst and under operating conditions as described herein. Effluent comprising aromatic hydrocarbons is removed from sixth reforming reactor 210F of second reactor stack S2 via sixth or final reforming reactor effluent outlet or 'hydrocarbon product' outlet line 225.

A stacked reactor system such as that of FIG. 2 may be operated via first, second, or third variation described hereinabove with reference to the embodiment of FIG. 1. In embodiments, a stacked reactor system such as that of FIG. 2 is operated via the first variation described hereinabove, with the reforming reactors operated as stationary fixed beds.

Figure 2:
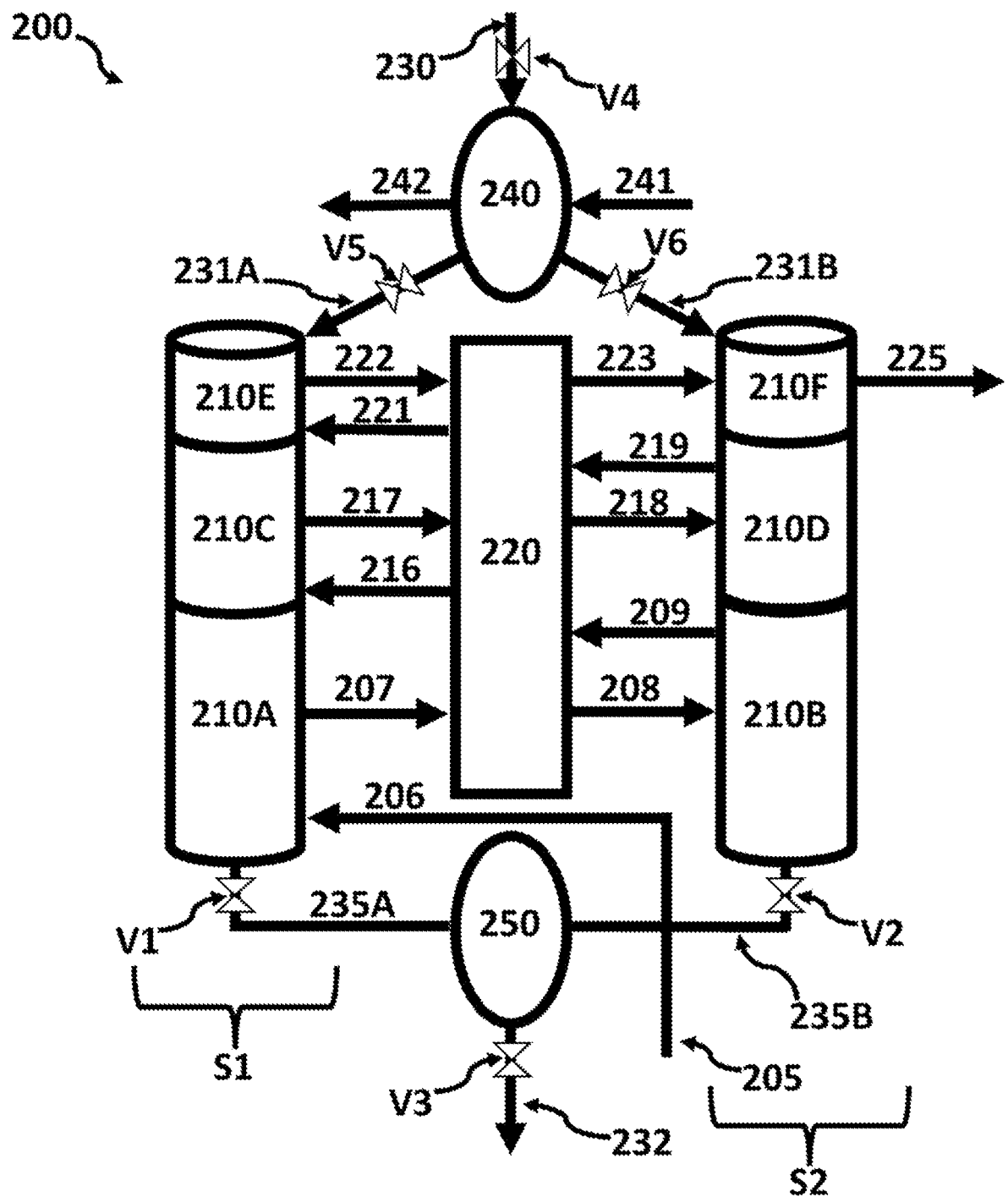
FIG. 2 is a flow diagram of a stacked reactor system for use in an aromatization process according to another embodiment of this disclosure.

In other embodiments, a system such as that of FIG. 2 is operated with continuous catalyst movement as in second and third variations described herein. For example, in embodiments, catalyst silo and/or activator 240 is periodically filled with fresh, regenerated, or spent catalyst (to be regenerated therein). For example, fresh catalyst may be introduced into catalyst silo and/or activator 240 via fresh or make-up catalyst inlet line 230 and valve V4. The catalyst may subsequently be dried and/or reduced as described hereinabove with reference to aspects of FIG. 1. The catalyst may be dried and/or reduced within catalyst silo 240 or may be dried and/or reduced via a vessel(s) corresponding to vessel(s) 150B described hereinabove with reference to embodiments of FIG. 1. For example, a vessel 150B may be attached to and/or fluidly connected with the topmost reactor of each reactor stack (e.g., in the embodiment of FIG. 2, attached to and/or fluidly connected with fifth reactor 210E of reactor stack S1 and sixth reactor 210F of second reactor stack S2). Treatment gas, such as hydrogen or nitrogen, may be introduced to catalyst silo and/or activator 240 via treatment component inlet line 241, and waste gas produced during the treatment may be removed from catalyst silo and/or activator via waste gas outlet line 242.

Prepared catalyst can be slowly fed to the top of one or more stacked reactor beds. In the embodiment of FIG. 2, catalyst is slowly fed via replacement catalyst transport line 231A and valve V5 to fifth reforming reactor 210E, which is the topmost reactor of first reactor stack S1; catalyst is slowly fed via replacement catalyst transport line 231B and valve V6 to sixth reforming reactor 210F, which is the topmost reactor of second reactor stack S2; or catalyst may be fed to both fifth reactor 210E of stack S1 and sixth reactor 210F of stack S2. The catalyst slowly flows down reactor stack S1 from fifth reforming reactor 210E to the bottommost reforming reactor of reactor stack S1 (i.e., first reforming reactor 210A) and down reactor stack S2 from sixth reforming reactor 210F to the bottommost reforming reactor of second reactor stack S2 (i.e., second reforming reactor 210B), thereby providing a catalyst activity gradient as discussed further herein. Spent catalyst can be removed from bottommost reactor of each of the reactor stacks. For example, in aspects of FIG. 2, used or spent catalyst can be removed from first reforming reactor 210A via valve V1 and used or spent catalyst transport line 235A, from second reforming reactor 210B via valve V2 and used or spent catalyst transport line 235B, or both.

In embodiments, spent catalyst is introduced, via spent catalyst transport line 235A and 235B, into a spent catalyst silo 250. The spent catalyst can be regenerated via the second variation described hereinabove, and returned to the reactor stacks, optionally via purge and/or reduction as described hereinabove. In embodiments, the spent catalyst is returned to catalyst silo and/or activator 240 for reactivation/regeneration. The regeneration may be effected as described herein with regards to embodiments of FIG. 1. For example, regeneration components suitable for decoking, oxychlorination, halogenation, or a combination thereof may be introduced into catalyst silo and/or activator 240 via treatment component inlet line 241, and waste gas produced during regeneration/reactivation may be removed from catalyst silo and/or activator via waste gas outlet line 242.

In embodiments, system 200 is operated via variation three described herein with reference to the embodiment of FIG. 1, where spent catalyst in spent catalyst silo 250 is directed to reclamation and/or disposal via catalyst purge line 232 and valve V3.

The time frame for movement of catalyst from the top to the bottom of the stacked reactors (e.g., the reactors of stack S1 and/or S2) can be on the order of months or years, depending on how the unit is sized and operated. Although depicted in the embodiment of FIG. 2 as increasing in size from the top of each reactor stack to the bottom thereof, the reactors within a reactor stack may increase, decrease, or remain the same in volume from the topmost to the bottommost reactor thereof, as noted with reference to the embodiment of FIG. 1. For example, in embodiments, the biggest reactor of each stack may be the topmost reactor thereof. The volume percentages of catalyst in the reactors may be as described hereinabove with reference to the embodiment of FIG. 1. For example, in embodiments, the volume ratios/percentages of the total aromatization catalyst in the first, second, third, fourth, fifth, and sixth reactors may be about 10%:10%:10%:20%:20%:30%.

As depicted in the embodiment of FIG. 2, the stacked reactor or CCR system may be configured for introduction of fresh hydrocarbon feed into a bottom reactor of one of the at least one reactor stacks, and upward through each reactor stack, such that reforming catalyst and hydrocarbon feed flow counter-currently through the at least one reactor stack. In this manner, catalyst having relatively lesser or decreased activity (e.g., catalyst farther down the reactor stack) may catalyze the easiest reactions and lower temperatures may potentially be used for these reactors (e.g., in first and second reforming reactors, 210A and 210B). Utilization of lower temperatures may result in less cracking and greater selectivity. As the feed becomes more converted in passing upward through the reactor stack(s), it contacts fresher/more active catalyst. Higher reaction temperatures can be utilized for reforming reactors higher up the stack(s) (e.g., in fifth and sixth reforming reactors, 210E and 210F) which contain the freshest catalyst. This fresher catalyst can promote the more difficult reactions with higher selectivity. In such embodiments, therefore, an operating temperature of a reactor (e.g., a bottom or bottommost reactor) of each of the at least one reactor stacks may be less than an operating temperature of a higher reactor (e.g., a top or topmost reactor) thereof.

Counter-current operation may also provide risk mitigation with respect to process upsets. In embodiments, the bottommost reactor of each or at least the first of the at least one reactor stacks to which hydrocarbon feed is introduced acts as a guard bed to protect downstream reactors which contain more active catalyst, from at least one undesirable compound. For example, in the embodiment of FIG. 2, bottommost reactor of first reactor stack S1 (i.e., first reforming reactor 210A) or both first reactor 210A and the bottommost reactor (i.e., second reforming reactor 210B) of second reactor stack S2 may operate as catalyst guard beds. The guard bed reactor(s) may serve to remove an undesirable compound or poison such as, without limitation, sulfur, heavies, nitrogen, iron, or a combination thereof. In addition, following an upset, deactivated catalyst can be easily removed without having to shut down the plant or run for sustained amounts of time with poor performance, as the spent catalyst in the guard bed(s) is closest to removal from the reactor stack(s), e.g., at the bottom of the reactor stacks S1 and S2 proximate catalyst discharge lines 235A and 235B. Utilization of such a method wherein the most spent catalyst of each reactor stack encounters the freshest hydrocarbon feed may enable the reforming reactor system to comprise no sulfur converter adsorber (SCA) upstream of the CCR or stacked reactor system.

Although depicted with hydrocarbon feed passing from the bottommost reactors of each reactor stack to the topmost reactors thereof, in embodiments, a stacked reactor system 200 can be configured for passage of hydrocarbon feed downward from the topmost radial flow reactor of each stack to the bottommost radial flow reactor thereof, such that reforming catalyst and hydrocarbon feed flow co-currently through the stacks. In such embodiments, an operating temperature of a given radial flow reactor may be lower than an operating temperature of a radial flow reactor downstream thereof and/or therebelow. Furthermore, the relative size of the reactors and corresponding volumetric distribution of catalyst within the reactor stacks S1 and S2 may be inverted from that shown in FIG. 2.

Aromatization Catalyst

In an embodiment, the aromatization catalyst support comprises a support. In embodiments, the support comprises an inorganic oxide. The inorganic oxides may include bound medium and/or large pore zeolites (aluminosilicates), amorphous inorganic oxides and mixtures thereof. Large pore zeolites include, but are not limited to, L-zeolite, Y-zeolite, mordenite, omega zeolite, beta zeolite, or other types of zeolites. Amorphous inorganic oxides include, but are not limited to, aluminum oxide, silicon oxide, and titania. The support may further comprise a bonding agent such as for example silica, alumina, clays, titania, and magnesium oxide. In certain aspects, the support does not comprise primarily or consist essentially of alumina. In embodiments, the zeolitic support contains a silica-bound L-zeolite support. In further aspects, the catalyst may be characterized by one or more of comprising a pelletized morphology (as compared to, e.g., a spherical morphology), a relatively lower crush strength, a zeolite support (versus, for instance, an alumina support), fluoride or fluorine, and platinum (Pt) as a catalytic metal as compared to, for example, the presence of Pt and tin (Sn) or both Pt and rhodium (Rh), and a relatively lower acidity as compared to typical reforming catalysts. In advantageous embodiments, a catalyst used in accordance with the disclosed systems and methods may be further characterized by significant greater benzene selectivity, relatively less cracking, and less coking in comparison with typical reforming catalysts.

In an embodiment, the catalyst support comprises a medium or large pore zeolite. The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms may be equal to 2. The framework exhibits a negative electrovalence that typically is balanced by the inclusion of cations within the crystal such as metals, alkali metals, alkaline earth metals, or hydrogen.

In an embodiment, the catalyst support comprises an L-type zeolite. L-type zeolite supports are a sub-group of zeolitic supports. Typical L-type zeolites contain mole ratios of oxides in accordance with the following formula:

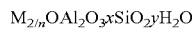

$M_{2/n}O{\cdot}Al_2O_3{\cdot}xSiO_2{\cdot}yH_2O$ wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite.

In an embodiment, the catalyst support comprises a bound potassium L-type zeolite, also referred to as KL zeolite. The term "KL zeolite" as used herein refers to L-type zeolites in which the principal cation M incorporated in the zeolite is potassium. A KL zeolite may be cation-exchanged or impregnated with another metal and one or more halides to produce a platinum-impregnated, halided zeolite or a KL supported Pt-halide zeolite catalyst. In some embodiments, the support is a KL zeolite. In other embodiments, the catalyst support may comprise a mixture of a zeolite and an inorganic oxide.

The catalyst support may contain up to about 95 wt. % L-zeolite by total weight of the support, alternatively about 60 wt. % to about 95 wt. %, alternatively from about 70 wt. % to about 92 wt. %, alternatively from about 80 wt. % to about 90 wt. %. In accordance with the present disclosure, the weight percentage by total weight of the catalyst support refers to the weight percentage of the component based on the final weight of the catalyst support.

In an embodiment, the catalyst comprises one or more catalytically active metals. Examples of such metals include without limitation Group IB metals and Group VIII transition metals of the Periodic Table such as iron (Fe), cobalt (Co), nickel (Ni), ruthenium (Ru), rhodium (Rh), palladium (Pd), osmium (Os), iridium (Ir), platinum (Pt), gold (Au), silver (Ag), copper (Cu), or combinations thereof. In an embodiment, the metal comprises platinum (Pt).

In an embodiment, the metal may be present in the catalyst in an amount from about 0.1 wt. % to about 50 wt. % by total weight of the catalyst, alternatively from about 0.1 wt. % to about 10 wt. %, alternatively from about 0.2 wt. % to about 5 wt. %, alternatively from about 0.3 wt. % to about 3 wt. %, alternatively from about 0.3 wt. % to about 2 wt. %. As used herein, the weight percentage of metals are based on the total weight of the catalyst.

In an embodiment, the catalyst comprises at least two halides. Examples of suitable halides include chloride, fluoride, bromide, iodide, or combinations thereof. In an embodiment the catalyst comprises chloride. Chloride may be present in the catalyst in an amount of from about 0.1 wt. % to about 5 wt. % by total weight of the catalyst, alternatively from about 0.2 wt. % to about 3 wt. %, alternatively from about 0.3 wt. % to about 2 wt. %.

In an embodiment, the catalyst comprises fluoride. Fluoride may be present in the catalyst in an amount of from about 0.1 wt. % to about 10 wt. % by total weight of catalyst, alternatively from about 0.2 wt. % to about 5 wt. %, alternatively from about 0.3 wt. % to about 3 wt. %.

In various embodiments, the catalyst comprises platinum (Pt) and chloride (Cl) in an atomic ratio of Pt:Cl from about 1.0:0.1 to about 1.0:20, alternatively from about 1.0:0.2 to about 1.0:15.0, alternatively from about 1.0:0.3 to about 1.0:10.0, including from about 1.0:0.5 to about 1.0:10, about 1.0:1.0 to about 1.0:5.0, about 1.0:2.0 to about 1.0:5.0, and about 1.0:4.5.

In an embodiment, a fresh catalyst may function to catalyze a user-desired process such as the aromatization of one of more hydrocarbons. As the catalyst is used for the conversion of hydrocarbons to desired products (e.g., aromatization), the catalyst activity will decrease with time due to a variety of factors. For example, carbonaceous materials may build up on the catalyst thus decreasing the number of catalytic sites available and the overall activity of the catalyst. In other instances, catalyst modifiers, or activity promoters, may have evolved from the catalyst over time resulting in lower activity or lower selectivity to the desired products. The activity or selectivity of the catalyst may decrease to a level wherein it is no longer beneficial to employ the catalyst in a user-desired process and/or regeneration is desired to enhance/restore the catalyst activity. Such catalysts may be characterized as 'spent' catalysts.

In embodiments, the reforming catalyst has a crush strength of less than about 15, 14, 13, 12, 11, or 10 $lb_f$. In embodiments, the reforming catalyst has a crush strength in the range of from about 7.5 to about 15 $lb_f$. In embodiments, the catalyst is an extrudate. In embodiments, the catalyst is cylindrical. In embodiments, the catalyst is spherical. In embodiments, the catalyst comprises AROMAX® catalyst in the form of spheres. In embodiments, the catalyst comprises AROMAX® catalyst in the form of cylindrical and/or spherical extrudates. The catalyst may have a size with respect to length (for cylindrical extrudates) in the range of from about 0.1 inches (in) to about 0.21 in, and with a circumference (for spherical extrudates) of from about 0.01 in to about 0.50 in, such as from about 0.05 in to about 0.25 in.

Aromatization Operating Conditions

The aromatization within the reforming reactors may be carried out under suitable operating conditions as known to those of skill in the art. In embodiments, the reactors are operated at a temperature in the range of from about 400° C. to about 600° C., including about 450° C. to about 550° C.;

a pressure in the range of from about 30 psig to about 100 psig, including about 50 psig to about 70 psig; a liquid hourly space velocity (LHSV) in the range of from about 1.0 $h^{-1}$ to about 4 $h^{-1}$, including about 1.0 $h^{-1}$ to about 2.3 $h^{-1}$; a capacity in the range of from about 4,000 to about 70,000 barrels per day (BPD); and a molar ratio of hydrogen to hydrocarbon in the feed in the range of from about 1.0 to about 5.0 mole:mole, such as a molar ratio of about 2.0 to about 4.0 mole:mole; or a combination thereof.

Retrofitting a CCR System with AROMAX® Catalyst

As noted hereinabove, in embodiments, an existing CCR system is repurposed and/or retrofitted for use with an aromatization catalyst, such as the AROMAX® catalyst. In embodiments, a method of operating a continuous catalyst regeneration (CCR) system according to this disclosure comprises operating the CCR system to convert hydrocarbons in a hydrocarbon feed into aromatic hydrocarbons, wherein catalyst is continuously circulated in a flow-loop within the CCR system and an entirety of the catalyst is thereby regenerated at least once a week; shutting down the CCR system to cease conversion of the convertible hydrocarbons into the aromatic hydrocarbons; and replacing the existing catalyst within the CCR system with a replacement catalyst comprising platinum, fluorine, and chlorine on a silica-bound L-zeolite support. In embodiments, the method further comprises starting up the CCR to continue conversion of the hydrocarbons in the hydrocarbon feed into the aromatic hydrocarbons, wherein the replacement catalyst is not continuously circulated in a flow-loop within the CCR system. In embodiments, the replacement catalyst is static within the CCR system during conversion of the hydrocarbons in the hydrocarbon feed into the aromatic hydrocarbons, and the method proceeds according to the first variation hereinabove, and a moving bed reactor system (i.e., the CCR system) is operated in a stationary or static mode. In alternative embodiments, the method further comprises starting up the CCR to continue conversion of the convertible hydrocarbons into the aromatic hydrocarbons, wherein the replacement catalyst is intermittently or continuously circulated in a flow-loop within the CCR system, and the method proceeds according to the second or third variation described hereinabove. In some such embodiments, the entirety of the catalyst is regenerated no more than once a year. In some such embodiments, the entirety of the catalyst passes through a stack of reforming reactors within the CCR no more than once a year.

Features and Potential Advantages

This disclosure describes a way to use a CCR reactor set up, either retrofitted or grassroots design, in the application of the AROMAX® technology available from Chevron Phillips Chemical (The Woodlands, Texas). The process for operating a stacked reactor system with AROMAX® catalyst as disclosed herein differs from traditional CCR operation in a variety of ways. According to embodiments of this disclosure, an existing CCR can be repurposed for use of the reforming radial flow reactors operated as stationary fixed beds, thereby utilizing a moving bed reactor system in a fixed bed process. Such operation may provide for more rapid catalyst replacement during change-out than conventional fixed bed radial flow reactor systems.

According to embodiments of this disclosure, an existing CCR is retrofitted for use with an aromatization catalyst as described herein, with slow movement of catalyst from the stacked reactor section to a regeneration and/or storage section (e.g., in accordance with the second and third variations described herein). Desirably, minimal equipment would be changed out when converting from a CCR reformer to an AROMAX® system, as described herein. In embodiments, regeneration is retrofitted to provide for the use of fluorine in the catalyst regeneration. Reforming reactor internals are often coated with tin MPT to prevent metal carburization due to the low sulfur environment in the AROMAX® process. However, the presence of tin MPT can be problematic during conventional regeneration procedures. An advantage of using a CCR set up, as described herein, for regeneration of the aromatization catalyst may be the ability to use a regeneration apparatus that is not coated with tin MPT. This may beneficially facilitate effective catalyst regeneration and result in significant catalyst cost savings.

The time frame for regeneration frequency is substantially different for the methods disclosed herein, relative to that of conventional CCR processes. According to embodiments of this disclosure, a CCR may be operated with aromatization catalyst in a temperature varied fashion due to fresher catalyst being in a first of a series of reforming reactors and spent catalyst in a last of the series. Retrofitting of an existing CCR for use as an AROMAX® plant may provide substantial capital savings relative to grassroots production if able to utilize an existing CCR.

In conventional CCR processes, all of the catalyst is typically regenerated about every week; according to this disclosure, a CCR system may be operated with aromatization catalyst (e.g., AROMAX® catalyst) being subjected to a regeneration once a year or even less frequently. The slow movement of aromatization catalyst through the stacked reactor system (according to the second and third variations provided herein) may help prevent/minimize catalyst degradation into fines. Such methods may enable the use of a CCR-type reactor system with a catalyst having attrition characteristics generally deemed too delicate for such use. For example, in embodiments, the aromatization catalyst is silica-bound L zeolite. The reduction in catalyst regeneration frequency provided via the herein-disclosed method may enable the use of such silica bound catalyst in a process (e.g., CCR process) typically operated with a tougher or more robust reforming catalyst. In embodiments, the catalyst is subjected to only 2-3 regenerations over 5 years.

As noted herein, conventional fixed bed radial flow aromatization reactor design often results in underutilization of catalyst that is located closer to the center pipe, with catalyst located on the inside of the fixed bed radial flow reactor generally retaining some activity when it is dumped at the end of run. Both variations two and three of the reforming method disclosed herein provide remixing and shuffling of the catalyst as it slowly moves from the first reforming reactor to the regenerator or storage unit. This may provide for more thorough catalyst utilization (i.e., a more completely and uniformly spent catalyst) than that provided with conventional fixed bed reactor processes. Variations two and three which employ slow movement of catalyst through the at least one reactor stack also enable aromatization catalyst change out without taking the plant down. This may provide significant turnaround savings. Variations two and three also may provide operation of an AROMAX® catalyst system with substantially steady-state performance and more predictable catalyst demand, thus facilitating operations.

As noted herein, operation with reforming catalyst and hydrocarbon feed flowing in a counter current fashion, in embodiments, enables the hydrocarbon feed to first contact the most spent catalyst (e.g., catalyst have a relatively low activity in comparison to a fresh catalyst, or stated alternatively catalyst that is at or near the lower activity value of a catalyst activity gradient that progresses from a higher activity value to a lower activity value). This spent catalyst may operate to catalyze the easiest reactions, and lower temperatures may be used in these reforming reactors, advantageously resulting in less cracking and greater selectivity. As the hydrocarbon feed becomes more converted, it contacts fresher catalyst. Higher reaction temperatures can be utilized for downstream reactors, which may contain the freshest catalyst in such embodiments. This fresher catalyst may more selectively promote the more difficult reactions with high selectivity. Such counter-current operation may also provide for risk mitigation with respect to process upsets; sulfur or heavy species in the feed first contact the most spent catalyst which is closest to being removed from the system. This spent catalyst can therefore act to protect the fresh catalyst. In addition, following the upset, the deactivated catalyst can be easily removed without having to shut down the plant or run for sustained amounts of time with poor catalyst performance. Due to this counter-current catalyst movement and positioning the most spent catalyst where the hydrocarbon feed enters, such operation may, in embodiments, obviate the need for an SCA system (e.g., without the need for one or more sulfur guard beds). Other advantages described above may also be realized with this counter-current flow.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having," "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim. Also, the terms in the claims have their plain, ordinary meaning unless otherwise explicitly and clearly defined by the patentee. Moreover, the indefinite articles "a" or "an", as used in the claims, are defined herein to mean one or more than one of the elements that it introduces. If there is any conflict in the usages of a word or term in this specification and one or more patent or other documents, the definitions that are consistent with this specification should be adopted.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

While certain embodiments of the disclosure have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Additional modifications, equivalents, and alternatives will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the detailed description of the present disclosure. The disclosures of all patents, patent applications, and publications cited herein are hereby incorporated by reference.

What is claimed is:

1. A reforming reactor system comprising:
    a continuous catalyst regeneration (CCR) system comprising at least one reactor stack, wherein each reactor stack comprises at least two radial flow reactors that separately comprise a reforming catalyst capable of catalyzing the conversion of hydrocarbons in a hydrocarbon feed to provide a reactor effluent comprising aromatic hydrocarbons;
    a regeneration reactor system connected to the at least one reactor stack via a spent catalyst transfer system, and configured for regenerating the spent reforming catalyst; wherein the reforming reactor system is configured for movement of the reforming catalyst through the at least one reactor stack over a time period of at least 180 days; and
wherein the reforming catalyst comprises a Group VIII metal, a silica-bound L-zeolite support, and at least one halogen, and wherein the reforming catalyst has a crush strength of less than about 15 $lb_f$, and wherein the CCR system is configured for:
    initial introduction of reforming catalyst into at least one topmost reactor via a purge vessel and a reduction reactor, wherein the at least one topmost reactor is a topmost reactor of one of the at least one reactor stacks; and
    introduction of fresh hydrocarbon feed into a bottommost radial flow reactor of one of the at least one reactor stacks, such that reforming catalyst and hydrocarbon feed flow counter-currently therethrough, wherein the bottommost radial flow reactor of each of the at least one reactor stacks acts as a guard bed to protect downstream reactors in the at least one reactor stack, which contain more active catalyst, from at least one undesirable compound selected from sulfur, heavies, nitrogen, or a combination thereof.

2. The reforming reactor system of claim 1, wherein the reforming catalyst comprises an extrudate characterized by a crush strength of less than about 15, 13, or 10 lb$_f$.

3. The reforming reactor system of claim 1, wherein the at least one halogen comprises fluorine and chlorine, and wherein regenerating comprises decoking, redispersing one or more metals of the spent reforming catalyst via oxychlorination, and reactivating via fluoridation.

4. The reforming reactor system of claim 1, wherein at least one surface or component of the regeneration reactor system is not coated with tin MPT, and wherein at least one internal component of the at least one reactor stack is coated with tin MPT.

5. The reforming reactor system of claim 1, wherein the reforming reactor system comprises no sulfur converter adsorber (SCA) upstream of the CCR system.

6. A method of operating the reforming reactor system of claim 1, the method comprising:
operating the reactors of the CCR system
to provide movement of the reforming catalyst through the at least one reactor stack over a time period of at least 180 days and to a regeneration system via a catalyst transfer system.

7. The method of claim 6, wherein operating the reactors of the stacked reactor system comprises operating the radial flow reactors as stationary fixed beds, and wherein the reforming catalyst is not moved during operation of a run.

8. The method of claim 6, further comprising:
converting the convertible hydrocarbons in the hydrocarbon feed until the reforming catalyst is determined to be a spent reforming catalyst and, after the catalyst is determined to be spent;
discontinuing the introduction of the hydrocarbon feed;
purging the reactors until the reactor effluent comprises less than about 200 ppm of hydrocarbons;
having the reactors reach ambient temperature;
removing the spent reforming catalyst within the radial flow reactors of each reactor stack via the bottommost radial flow reactor of each reactor stack or via the bottommost reactor of a final reactor stack with conveying between stacks, with the catalyst flowing downward through the at least one stack of radial flow reactors for removal; and
adding fresh reforming catalyst to the top of a topmost radial flow reactor of each reactor stack or to the top of the topmost radial flow reactor of the first reactor stack with conveying between stacks, wherein fresh reforming catalyst flows downward through the at least one stack of radial flow reactors.

9. The method of claim 6, wherein the reforming reactor system further comprises at least one purge chamber fluidly attached to a bottommost radial flow reactor of each reactor stack or a bottommost reactor of a final reactor stack with conveying between stacks; and wherein the spent reforming catalyst is removed from the bottommost radial flow reactor through the purge chamber prior to removing the catalyst from the stacked reactor system.

10. The method of claim 6, wherein the stacked reactor system further comprises at least one purge chamber fluidly connected to the topmost radial flow reactor of each reactor stack or a topmost reactor of a first reactor stack operable for conveyance between stacks; and wherein the fresh reforming catalyst is added to the topmost radial flow reactor through the purge chamber.

11. The method of claim 6, wherein the catalyst transfer system fluidly connects at least one purge chamber with a top of the regeneration system for transferring the reforming catalyst through at least one purge chamber attached to the bottommost radial flow reactor of each of the at least one reactor stacks or the bottommost radial flow reactor of a final of the at least one reactor stacks with conveying between stacks, to the regeneration system.

12. The method of claim 6, further comprising regenerating the reforming catalyst via a regeneration process comprising decoking, chlorination, oxychlorination, fluorination, reduction, or a combination thereof during passage through the regeneration system, and introducing the regenerated reforming catalyst to a topmost radial flow reactor of each of the at least one reactor stacks or to a topmost radial flow reactor of a first reactor stack with conveying between stacks.

13. The method of claim 6, wherein the regeneration system is operable to provide movement of the reforming catalyst through a series of radial flow regeneration reactors, and wherein the reforming catalyst passes through the regeneration system, and back to the stacked reactor system via a regenerated catalyst transfer system over a time period of about 170 hours.

14. The method of claim 6, wherein the stacked reactor system further comprises a regenerator, and wherein the regenerator is utilized for storage of spent catalyst and capable of, upon an amount of spent catalyst stored in the regenerator reaching a predetermined threshold amount, regenerating the spent catalyst stored in the regenerator.

15. The method of claim 6, further comprising loading the fresh reforming catalyst into a purge chamber and a reduction vessel prior to loading into a topmost reactor of the at least one reactor stack, and reducing the fresh reforming catalyst prior to introducing the same as the replacement catalyst into the topmost reactor of the at least one reactor stack.

16. The method of claim 6, wherein the stacked reactor system is configured for initial introduction of reforming catalyst into a purge tank connected to a reduction vessel connected to a topmost radial flow reactor of one of the at least one reactor stacks.

17. The method of claim 6, wherein an operating temperature of a bottom reactor of each of the at least one reactor stacks is less than an operating temperature of a top reactor thereof, and the bottom reactor of each of the at least one reactor stacks is capable of performing as a guard bed to protect downstream reactors in the at least one reactor stack, which contains more active catalyst, from at least one undesirable compound comprising sulfur, heavies, nitrogen, or a combination thereof.

* * * * *